United States Patent
Gao et al.

(10) Patent No.: US 10,938,627 B2
(45) Date of Patent: Mar. 2, 2021

(54) PACKET PROCESSING METHOD, DEVICE, AND NETWORK SYSTEM

(71) Applicant: Huawei Technologies Co., Ltd., Shenzhen (CN)

(72) Inventors: Yuan Gao, Nanjing (CN); Wenhui Li, Nanjing (CN); Wanmei Zeng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 16/426,899

(22) Filed: May 30, 2019

(65) Prior Publication Data

US 2019/0296966 A1    Sep. 26, 2019

Related U.S. Application Data

(63) Continuation of application No. PCT/CN2017/111610, filed on Nov. 17, 2017.

(30) Foreign Application Priority Data

Mar. 10, 2017   (CN) .......................... 201710141773.5

(51) Int. Cl.
*H04L 12/24* (2006.01)
*H04L 12/46* (2006.01)
(Continued)

(52) U.S. Cl.
CPC ...... *H04L 41/0668* (2013.01); *H04L 12/4641* (2013.01); *H04L 41/0677* (2013.01);
(Continued)

(58) Field of Classification Search
CPC ............. H04L 41/0668; H04L 12/4641; H04L 41/0677; H04L 45/22; H04L 45/28
See application file for complete search history.

(56) References Cited

U.S. PATENT DOCUMENTS 9,397,931 B1    7/2016   Mohanty et al.
2006/0209682 A1* 9/2006 Filsfils .................... H04L 45/28
                                                                      370/219
(Continued)

FOREIGN PATENT DOCUMENTS

CN    101330424 A    12/2008
CN    101753464 A     6/2010
(Continued)

OTHER PUBLICATIONS

Machine Translation and Abstract of Chinese Publication No. CN101330424, dated Dec. 24, 2008, 16 pages.
(Continued)

*Primary Examiner* — Jael M Ulysse
(74) *Attorney, Agent, or Firm* — Conley Rose, P.C.

(57) ABSTRACT

A packet processing method includes sending, by the first provider edge (PE) device, a Media Access Control (MAC) entry update packet to a third PE device when a port of a first PE device that is connected to a customer edge (CE) device is switched from an activated state to a deactivated state, wherein the MAC entry update packet is sent to trigger the third PE device to delete a first MAC entry whose packet forwarding destination address is the first PE device, generating, through learning, a second MAC entry whose packet forwarding destination address is a second PE device, and forwarding a packet based on the second MAC entry.

20 Claims, 13 Drawing Sheets

(51) Int. Cl.
*H04L 12/707* (2013.01)
*H04L 12/703* (2013.01)
*H04L 12/721* (2013.01)
*H04L 12/741* (2013.01)
*H04L 12/709* (2013.01)

(52) U.S. Cl.
CPC ............ *H04L 45/22* (2013.01); *H04L 45/245* (2013.01); *H04L 45/28* (2013.01); *H04L 45/66* (2013.01); *H04L 45/74* (2013.01)

(56) References Cited

U.S. PATENT DOCUMENTS

| | | | |
|---|---|---|---|
| 2007/0118595 A1* | 5/2007 | Jain | H04L 12/462 709/203 |
| 2011/0194404 A1 | 8/2011 | Kluger et al. | |
| 2012/0087232 A1* | 4/2012 | Hanabe | G06F 11/2002 370/217 |
| 2014/0204761 A1* | 7/2014 | Durrani | H04L 47/125 370/236 |
| 2015/0281096 A1 | 10/2015 | Boutros et al. | |
| 2015/0304127 A1* | 10/2015 | Xiao | H04L 45/00 370/254 |
| 2016/0378606 A1* | 12/2016 | Sajassi | H04L 45/28 714/4.2 |
| 2017/0099180 A1* | 4/2017 | Singh | H04L 12/413 |
| 2017/0163530 A1 | 6/2017 | Drake et al. | |
| 2017/0373973 A1* | 12/2017 | Bickhart | H04L 45/741 |
| 2018/0006995 A1* | 1/2018 | Bickhart | H04L 45/66 |

FOREIGN PATENT DOCUMENTS

| | | |
|---|---|---|
| CN | 101820397 A | 9/2010 |
| CN | 102088400 A | 6/2011 |
| CN | 102142931 A | 8/2011 |
| CN | 104135420 A | 11/2014 |
| CN | 105591924 A | 5/2016 |
| CN | 105791072 A | 7/2016 |
| WO | 2008080312 A1 | 7/2008 |

OTHER PUBLICATIONS

Machine Translation and Abstract of Chinese Publication No. CN101753464, dated Jun. 23, 2010, 15 pages.
Machine Translation and Abstract of Chinese Publication No. CN101820397, dated Sep. 1, 2010, 21 pages.
Machine Translation and Abstract of Chinese Publication No. CN104135420, dated Nov. 5, 2014, 28 pages.
Foreign Communication From a Counterpart Application, Chinese Application No. 201710141773.5, Chinese Office Action dated Mar. 3, 2020, 5 pages.
Machine Translation and Abstract of International Publication No. WO2008080312, dated Jul. 10, 2008, 22 pages.
Sajassi, A., et al, "A Network Virtualization Overlay Solution using EVPN," XP015116866, draft-ietf-bess-evpn-overlay-07, Dec. 1, 2016, pp. 1-28.
Foreign Communication From a Counterpart Application, European Application No. 17900130.0, Extended European Search Report dated Oct. 25, 2019, 12 pages.
Machine Translation and Abstract of Chinese Publication No. CN102088400, dated Jun. 8, 2011, 14 pages.
Machine Translation and Abstract of Chinese Publication No. CN102142931, dated Aug. 3, 2011, 13 pages.
Machine Translation and Abstract of Chinese Publication No. CN105791072, dated Jul. 20, 2016, 29 pages.
Foreign Communication From a Counterpart Application, PCT Application No. PCT/CN2017/111610, English Translation of International Search Report dated Feb. 14, 2018, 2 pages.

* cited by examiner

PACKET PROCESSING METHOD, DEVICE, AND NETWORK SYSTEM

CROSS-REFERENCE TO RELATED APPLICATIONS

This application is a continuation of International Application No. PCT/CN2017/111610, filed on Nov. 17, 2017, which claims priority to Chinese Patent Application No. 201710141773.5, filed on Mar. 10, 2017. The disclosures of the aforementioned applications are hereby incorporated by reference in their entireties.

TECHNICAL FIELD

The present application relates to the field of communications technologies, and in particular, to a packet processing method, a device, and a network system.

BACKGROUND

Virtual extensible local area network (VXLAN) is a technology for encapsulating a layer-2 packet by using a layer-3 protocol based on an IP network and in a MAC-in-UDP packet encapsulation mode. Specifically, an Ethernet frame based on the Media Access Control (MAC) protocol is encapsulated into a User Datagram Protocol (UDP) packet. In the VXLAN technology, a VXLAN network segment is identified by using a VXLAN network identifier (VNI), to distinguish between different VXLAN network segments, and a length of the VXLAN network identifier is 24 bits.

In a VXLAN network, usually, an all-active gateway technology is used to improve network reliability. An all-active gateway means that a plurality of VXLAN gateway devices form one load sharing group, and forward a packet at the same time, to implement equal and weighted cost multi-path (ECMP). In the VXLAN network, an all-active VXLAN gateway device is virtualized into one device by using a multi chassis trunk (MC-Trunk) link. The MC-trunk link may also be referred to as an enhanced trunk (E-trunk) link. Address resolution protocol (ARP) entries and MAC entries need to be synchronized between VXLAN gateway devices. Therefore, in the prior art, an entry backup link is established between all-active gateways, to synchronize the ARP entries and the MAC entries between the VXLAN gateway devices, to ensure reliability of the VXLAN network.

However, in the prior art, a process of establishing the entry backup link between the all-active gateways is relatively complex. If a fault occurs on a link during a packet transmission process, the link cannot be restored rapidly, thereby affecting reliability of the VXLAN network.

SUMMARY

In view of this, embodiments of this application provide a packet processing method, a device, and a network system, to resolve a problem in the prior art that because a process of establishing an entry backup link between all-active gateways is relatively complex, when a fault occurs on a packet transmission link, rapid link restoration cannot be implemented, thereby affecting reliability of a VXLAN network.

According to a first aspect, an embodiment of this application provides a packet processing method, where the method is applied to a network that includes a first provider edge PE device, a second PE device, a third PE device, and a customer edge CE device, the CE device is dual-homed to the first PE device and the second PE device through multi chassis trunk MC-trunk links, a port that is of the first PE device and that is connected to the CE device is in an activated state, a port that is of the second PE device and that is connected to the CE device is in a deactivated state, the first PE device and the second PE device each communicate with the third PE device through virtual extensible local area network VXLAN tunnels, and the method includes determining, by the first PE device based on a case in which a first fault detection packet from the CE device is not received within a preset period, that a fault occurs on a link between the first PE device and the CE device, switching the port that is of the first PE device and that is connected to the CE device from the activated state to the deactivated state, and stopping sending a port status packet to the second PE device, where the port status packet is used to indicate that the port that is of the first PE device and that is connected to the CE device is in a normal state; and sending, by the first PE device, a Media Access Control MAC entry update packet to the third PE device, where the MAC entry update packet is used to instruct the third PE device to delete a first MAC entry whose packet forwarding destination address is the first PE device.

In the foregoing solution, when the port that is of the first PE device and that is connected to the CE device is switched from the activated state to the deactivated state, the second PE device switches the port that is of the second PE device and that is connected to the CE device from the deactivated state to the activated state. The first PE device sends the MAC entry update packet to the third PE device, to trigger the third PE device to delete the first MAC entry whose packet forwarding destination address is the first PE device, generate, through learning, a second MAC entry whose packet forwarding destination address is the second PE device, and forward a packet based on the second MAC entry. Therefore, after a fault occurs on a PE device, where a port that is of the PE device and that is connected to the CE device is in the activated state, a route is rapidly switched to a standby PE device to restore a link to forward a packet, so that reliability of a VXLAN network is ensured. Further, a new packet forwarding destination address is designated, so that consistency between a transmission direction of an uplink packet and a transmission direction of a downlink packet is ensured, helping a firewall to detect a packet.

In a possible design, the network system further includes a control device, and correspondingly, the sending, by the first PE device, a Media Access Control MAC entry update packet to the third PE device includes sending, by the first PE device, the MAC entry update packet to the control device, where the MAC entry update packet is a notification message, the notification message is used to instruct the control device to generate a Media Access Control-withdraw MAC-withdraw packet and send the MAC-withdraw packet to the third PE device, and the MAC-withdraw packet is used to instruct the third PE device to delete the first MAC entry whose packet forwarding destination address is the first PE device.

In the foregoing solution, the first PE device sends the MAC entry update packet used as the notification message to the control device, to instruct the control device to generate the MAC-withdraw packet and send the MAC-withdraw packet to the third PE device, so that the third PE device deletes the corresponding MAC entry based on the MAC-withdraw packet, and then re-learns a route of sending a packet to the CE device via the second PE device, to rapidly restore link transmission and improve security of the VXLAN network.

In a possible design, the sending, by the first PE device, a Media Access Control MAC entry update packet to the third PE device includes sending, by the first PE device, the MAC entry update packet to the second PE device, where the MAC entry update packet is a notification message, the notification message is used to instruct the second PE device to send, to the third PE device by using an Ethernet virtual private network EVPN protocol, a first MAC-withdraw packet that is generated by extending an Ethernet auto-discovery per Ethernet segment Ethernet A-D per ES route in the EVPN protocol, and the first MAC-withdraw packet is used to instruct the third PE device to delete the first MAC entry whose packet forwarding destination address is the first PE device, where an EVPN peer relationship is established between every two of the first PE device, the second PE device, and the third PE device.

In the foregoing solution, the first PE device sends the MAC entry update packet used as the notification message to the second PE device, to instruct the second PE device to generate the MAC-withdraw packet and send the MAC-withdraw packet to the third PE device based on the EVPN protocol, so that the third PE device deletes the corresponding MAC entry based on the MAC-withdraw packet, and then re-learns a route of sending a packet to the CE device via the second PE device, to rapidly restore link transmission and improve security of the VXLAN network.

In a possible design, the sending, by the first PE device, a Media Access Control MAC entry update packet to the third PE device includes sending, by the first PE device, the MAC entry update packet to the second PE device, where the MAC entry update packet is a notification message, the notification message is used to instruct the second PE device to send, to the third PE device by using an Ethernet virtual private network EVPN protocol, a second MAC-withdraw packet that is generated by extending an advertisement message in the EVPN protocol, and the second MAC-withdraw packet is used to instruct the third PE device to delete the first MAC entry whose packet forwarding destination address is the first PE device, where an EVPN peer relationship is established between every two of the first PE device, the second PE device, and the third PE device.

In the foregoing solution, the first PE device sends the MAC entry update packet used as the notification message to the second PE device, to instruct the second PE device to generate the MAC-withdraw packet and send the MAC-withdraw packet to the third PE device based on the EVPN protocol, so that the third PE device deletes the corresponding MAC entry based on the MAC-withdraw packet, and then re-learns a route of sending a packet to the CE device via the second PE device, to rapidly restore link transmission and improve security of the VXLAN network.

In a possible design, the sending, by the first PE device, a Media Access Control MAC entry update packet to the third PE device includes extending, by the first PE device, an Ethernet auto-discovery per Ethernet segment Ethernet A-D per ES route in an Ethernet virtual private network EVPN protocol to generate a first MAC-withdraw packet, where the first MAC-withdraw packet is used to instruct the third PE device to delete the first MAC entry whose packet forwarding destination address is the first PE device; and using the first MAC-withdraw packet as the MAC entry update packet; and sending, by the first PE device, the MAC entry update packet to the third PE device by using the EVPN protocol, where an EVPN peer relationship is established between every two of the first PE device, the second PE device, and the third PE device.

In the foregoing solution, the first PE device extends the Ethernet A-D per ES route in the EVPN protocol, and sends the extended Ethernet A-D per ES route to the third PE device, so that the third PE device deletes the corresponding MAC entry based on the extended Ethernet A-D per ES route, and then re-learns a route of sending a packet to the CE device via the second PE device, to rapidly restore link transmission and improve security of the VXLAN network.

In a possible design, the sending, by the first PE device, a Media Access Control MAC entry update packet to the third PE device includes extending, by the first PE device, an advertisement message in an Ethernet virtual private network EVPN protocol to generate a second MAC-withdraw packet, where the second MAC-withdraw packet is used to instruct the third PE device to delete the first MAC entry whose packet forwarding destination address is the first PE device; and using the second MAC-withdraw packet as the MAC entry update packet; and sending, by the first PE device, the MAC entry update packet to the third PE device by using the EVPN protocol, where an EVPN peer relationship is established between every two of the first PE device, the second PE device, and the third PE device.

In the foregoing solution, the first PE device extends the advertisement message in the EVPN protocol, and sends the extended advertisement message to the third PE device, so that the third PE device deletes the corresponding MAC entry based on the extended advertisement message, and then re-learns a route of sending a packet to the CE device via the second PE device, to rapidly restore link transmission and improve security of the VXLAN network.

According to a second aspect, an embodiment of this application provides a packet processing method, where the method is applied to a network system that includes a first provider edge PE device, a second PE device, a third PE device, a customer edge CE device, and a control device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, the first PE device and the second PE device each communicate with the third PE device through virtual extensible local area network VXLAN tunnels, and the method includes receiving, by the control device, a MAC entry update packet sent by the first PE device, where the MAC entry update packet is a notification message, and the notification message is used to instruct the control device to generate a Media Access Control-withdraw MAC-withdraw packet and send the MAC-withdraw packet to the third PE device; and generating, by the control device, the MAC-withdraw packet based on the notification message, and sending the MAC-withdraw packet to the third PE device, where the MAC-withdraw packet is used to instruct the third PE device to delete a first MAC entry whose packet forwarding destination address is the first PE device.

In the foregoing solution, the first PE device sends the MAC entry update packet used as the notification message to the control device, to instruct the control device to generate the MAC-withdraw packet and send the MAC-withdraw packet to the third PE device, so that the third PE device deletes the corresponding MAC entry based on the MAC-withdraw packet, and then re-learns a route of sending a packet to the CE device via the second PE device, to rapidly restore link transmission and improve security of a VXLAN network.

According to a third aspect, an embodiment of this application provides a packet processing method, where the method is applied to a network system that includes a first provider edge PE device, a second PE device, a third PE device, and a customer edge CE device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, an EVPN peer relationship is established between the first PE device, the second PE device, and the third PE device, and the method includes determining, by the second PE device based on a case in which a port status packet sent by the first PE device is not received within a preset period, that a fault occurs on a link between the first PE device and the CE device or a fault occurs on the first PE device, and switching the port that is of the second PE device and that is connected to the CE device from the deactivated state to the activated state, where the port status packet is used to indicate that the port that is of the first PE device and that is connected to the CE device is in a normal state; extending, by the second PE device, an Ethernet virtual private network EVPN protocol packet to generate a MAC-withdraw packet, where the MAC-withdraw packet is used to instruct the third PE device to delete a first MAC entry whose packet forwarding destination address is the first PE device, and generate, through learning, a second MAC entry whose packet forwarding destination address is the second PE device; receiving, by the second PE device, a Media Access Control MAC entry update packet sent by the first PE device, where the MAC entry update packet is a notification message, and the notification message is used to instruct the second PE device to send the MAC-withdraw packet to the third PE device by using an EVPN protocol; and sending, by the second PE device, the MAC-withdraw packet to the third PE device based on the notification message by using the EVPN protocol.

In the foregoing solution, when determining that a fault occurs on the link between the first PE device and the CE device or a fault occurs on the first PE device, the second PE device switches the port that is of the second PE device and that is connected to the CE device from the deactivated state to the activated state, extends the Ethernet virtual private network EVPN protocol packet to generate the MAC-withdraw packet, and sends the MAC-withdraw packet to the third PE device, so that the third PE device deletes the corresponding MAC entry based on the MAC-withdraw packet, and then re-learns a route of sending a packet to the CE device via the second PE device, to rapidly restore link transmission and improve security of a VXLAN network.

In a possible design, the extending, by the second PE device, an Ethernet virtual private network EVPN protocol packet to generate a MAC-withdraw packet includes extending, by the second PE device, an Ethernet auto-discovery per Ethernet segment Ethernet A-D per ES route in the EVPN protocol to generate a first MAC-withdraw packet, and using the first MAC-withdraw packet as the MAC-withdraw packet; or extending, by the second PE device, an advertisement message in the EVPN protocol to generate a second MAC-withdraw packet, and using the second MAC-withdraw packet as the MAC-withdraw packet.

In the foregoing solution, the second PE device extends the EVPN protocol packet in different manners to generate corresponding MAC-withdraw packets, and sends the MAC-withdraw packets to the third PE device, so that the third PE device deletes the corresponding MAC entry based on the MAC-withdraw packets, and re-learns a route of sending a packet to the CE device via the second PE device, to rapidly restore link transmission and improve security of the VXLAN network.

According to a fourth aspect, an embodiment of this application discloses a packet processing method, where the method is applied to a network system that includes a first provider edge PE device, a second PE device, a third PE device, and a customer edge CE device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, an EVPN peer relationship is established between the first PE device, the second PE device, and the third PE device, and the method includes receiving, by the third PE device, a BFD down packet that is reported through a port connected to the first PE device, and determining that a fault occurs on an AC side of the first PE device or that a fault occurs on the first PE device; triggering, by the third PE device, a MAC-flush event for the first PE device based on the BFD down packet; and executing, by the third PE device, the MAC-flush event, and deleting a first MAC entry whose packet forwarding destination address is the first PE device.

In the foregoing solution, when a fault occurs on the first PE device, a WAN-side BFD session between the first PE device and the third PE device is interrupted. The third PE device receives the BFD down packet that is reported through the port connected to the first PE device. The third PE device performs, based on the BFD down packet, an operation of deleting the first MAC entry whose packet forwarding destination address is the first PE device, and then enables a sent packet to pass through the second PE device to arrive at the first PE device, to rapidly restore link transmission and improve security of a VXLAN network.

According to a fifth aspect, an embodiment of this application discloses and provides a first provider edge PE device, where the first PE device is applied to a network system that includes the first PE device, a second PE device, a third PE device, and a customer edge CE device, the CE device is dual-homed to the first PE device and the second PE device through multi chassis trunk MC-trunk links, a port that is of the first PE device and that is connected to the CE device is in an activated state, a port that is of the second PE device and that is connected to the CE device is in a deactivated state, the first PE device and the second PE device each communicate with the third PE device through virtual extensible local area network VXLAN tunnels, and the first PE device includes a processing unit, configured to: determine, based on a case in which a first fault detection packet from the CE device is not received within a preset period, that a fault occurs on a link between the first PE device and the CE device, switch the port that is of the first PE device and that is connected to the CE device from the activated state to the deactivated state, and stop sending a port status packet to the second PE device, where the port status packet is used to indicate that the port that is of the first PE device and that is connected to the CE device is in a normal state; and a sending unit, configured to send a Media Access Control MAC entry update packet to the third PE device, where the MAC entry update packet is used to instruct the third PE device to delete a first MAC entry whose packet forwarding destination address is the first PE device.

In a possible design, the network system further includes a control device; and the sending unit is configured to send the MAC entry update packet to the control device, where the MAC entry update packet is a notification message, the notification message is used to instruct the control device to generate a Media Access Control-withdraw MAC-withdraw packet and send the MAC-withdraw packet to the third PE device, and the MAC-withdraw packet is used to instruct the third PE device to delete the first MAC entry whose packet forwarding destination address is the first PE device and generate, through learning, a second MAC entry whose packet forwarding destination address is the second PE device.

In a possible design, the sending unit is configured to send the MAC entry update packet to the second PE device, where the MAC entry update packet is a notification message, the notification message is used to instruct the second PE device to send, to the third PE device by using an Ethernet virtual private network EVPN protocol, a first MAC-withdraw packet that is generated by extending an Ethernet auto-discovery per Ethernet segment Ethernet A-D per ES route in the EVPN protocol, and the first MAC-withdraw packet is used to instruct the third PE device to delete the first MAC entry whose packet forwarding destination address is the first PE device and generate, through learning, a second MAC entry whose packet forwarding destination address is the second PE device, where an EVPN peer relationship is established between every two of the first PE device, the second PE device, and the third PE device.

In a possible design, the sending unit is configured to send the MAC entry update packet to the second PE device, where the MAC entry update packet is a notification message, the notification message is used to instruct the second PE device to send, to the third PE device by using an Ethernet virtual private network EVPN protocol, a second MAC-withdraw packet that is generated by extending an advertisement message in the EVPN protocol, and the second MAC-withdraw packet is used to instruct the third PE device to delete the first MAC entry whose packet forwarding destination address is the first PE device and generate, through learning, a second MAC entry whose packet forwarding destination address is the second PE device, where an EVPN peer relationship is established between every two of the first PE device, the second PE device, and the third PE device.

In a possible design, the processing unit is configured to: extend an Ethernet auto-discovery per Ethernet segment Ethernet A-D per ES route in an Ethernet virtual private network EVPN protocol to generate a first MAC-withdraw packet, where the first MAC-withdraw packet is used to instruct the third PE device to delete the first MAC entry whose packet forwarding destination address is the first PE device and generate, through learning, a second MAC entry whose packet forwarding destination address is the second PE device; and use the first MAC-withdraw packet as the MAC entry update packet; and the sending unit is configured to send the MAC entry update packet to the third PE device by using the EVPN protocol, where an EVPN peer relationship is established between every two of the first PE device, the second PE device, and the third PE device.

In a possible design, the processing unit is configured to: extend an advertisement message in an Ethernet virtual private network EVPN protocol to generate a second MAC-withdraw packet, where the second MAC-withdraw packet is used to instruct the third PE device to delete the first MAC entry whose packet forwarding destination address is the first PE device and generate, through learning, a second MAC entry whose packet forwarding destination address is the second PE device; and use the second MAC-withdraw packet as the MAC entry update packet; and the sending unit is configured to send the MAC entry update packet to the third PE device by using the EVPN protocol, where an EVPN peer relationship is established between every two of the first PE device, the second PE device, and the third PE device.

According to a sixth aspect, an embodiment of this application provides a first PE device. The first PE device includes a processor, a network interface, and a memory. The memory may be configured to store program code and data of the first PE device, and the processor is configured to invoke a program instruction in the memory, to perform the method in the foregoing aspect and design. For specific execution steps, refer to the foregoing aspect, and details are not described herein again.

According to a seventh aspect, an embodiment of this application provides a control device, where the control device is applied to a network system that includes a first provider edge PE device, a second PE device, a third PE device, a customer edge CE device, and the control device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, the first PE device and the second PE device each communicate with the third PE device through virtual extensible local area network VXLAN tunnels, and the control device includes a receiving unit, configured to receive a MAC entry update packet sent by the first PE device, where the MAC entry update packet is a notification message, and the notification message is used to instruct the control device to generate a Media Access Control-withdraw MAC-withdraw packet and send the MAC-withdraw packet to the third PE device; and a processing unit, configured to: generate the MAC-withdraw packet based on the notification message, and send the MAC-withdraw packet to the third PE device, where the MAC-withdraw packet is used to instruct the third PE device to delete a first MAC entry whose packet forwarding destination address is the first PE device and generate, through learning, a second MAC entry whose packet forwarding destination address is the second PE device.

According to an eighth aspect, an embodiment of this application provides a control device. The control device includes a processor, a network interface, and a memory. The memory may be configured to store program code and data of the control device, and the processor is configured to invoke a program instruction in the memory, to perform the method in the foregoing aspect and design. For specific execution steps, refer to the foregoing aspect, and details are not described herein again.

According to a ninth aspect, an embodiment of this application provides a second provider edge PE device, where the second PE device is applied to a network system that includes a first PE device, the second PE device, a third PE device, and a customer edge CE device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, an EVPN peer relationship is established between the first PE device, the second PE device, and the third PE device, and the second PE device includes a processing unit, configured to: determine, based on a case in which a port status packet sent by the first PE device is not received within a preset period, that a fault occurs on a link between the first PE device and the CE device or a fault occurs on the first PE device, and switch the port that is of the second PE device and that is connected to the CE device from the deactivated state to the activated state, where the port status packet is used to indicate that the port that is of the first PE device and that is connected to the CE device is in a normal state; and extend an Ethernet virtual private network EVPN protocol packet to generate a MAC-withdraw packet, where the MAC-withdraw packet is used to instruct the third PE device to delete a first MAC entry whose packet forwarding destination address is the first PE device and generate, through learning, a second MAC entry whose packet forwarding destination address is the second PE device; a receiving unit, configured to receive a Media Access Control MAC entry update packet sent by the first PE device, where the MAC entry update packet is a notification message, and the notification message is used to instruct the second PE device to send the MAC-withdraw packet to the third PE device by using an EVPN protocol; and a sending unit, configured to send the MAC-withdraw packet to the third PE device based on the notification message by using the EVPN protocol.

In a possible design, the processing unit that extends the Ethernet virtual private network EVPN protocol packet to generate the MAC-withdraw packet is configured to: extend an Ethernet auto-discovery per Ethernet segment Ethernet A-D per ES route in the EVPN protocol to generate a first MAC-withdraw packet, and use the first MAC-withdraw packet as the MAC-withdraw packet; or extend an advertisement message in the EVPN protocol to generate a second MAC-withdraw packet, and use the second MAC-withdraw packet as the MAC-withdraw packet.

According to a tenth aspect, an embodiment of this application provides a second PE device. The second PE device includes a processor, a network interface, and a memory. The memory may be configured to store program code and data of the second PE device, and the processor is configured to invoke a program instruction in the memory, to perform the method in the foregoing aspect and design. For specific execution steps, refer to the foregoing aspect, and details are not described herein again.

According to an eleventh aspect, an embodiment of this application provides a third PE device, where the third PE device is applied to a network system that includes a first PE device, a second PE device, the third PE device, and a customer edge CE device, the first PE device and the second PE device are connected to the CE device through multi chassis trunk MC-trunk links, a port that is of the first PE device and that is connected to the CE device is in an activated state, a port that is of the second PE device and that is connected to the CE device is in a deactivated state, an EVPN peer relationship is established between the first PE device, the second PE device, and the third PE device, and the third PE device includes a receiving unit, configured to receive a MAC-withdraw packet from the second PE device, or configured to receive a MAC-withdraw packet from the first PE device, or configured to receive a BFD down packet that is reported through a port connected to the first PE device, or configured to receive a MAC-withdraw packet sent by a control device; and a processing unit, configured to: delete a first MAC entry whose packet forwarding destination address is the first PE device based on the MAC-withdraw packet, or trigger a MAC-flush event for the first PE device based on the BFD down packet, and delete a first MAC entry whose packet forwarding destination address is the first PE device.

According to a twelfth aspect, an embodiment of this application provides a third PE device. The third PE device includes a processor, a network interface, and a memory. The memory may be configured to store program code and data of the third PE device, and the processor is configured to invoke a program instruction in the memory, to perform the method in the foregoing aspect and design. For specific execution steps, refer to the foregoing aspect, and details are not described herein again.

According to a thirteenth aspect, an embodiment of this application provides a network system, where the network system includes a first provider edge PE device, a second PE device, a third PE device, and a customer edge CE device, the CE device is dual-homed to the first PE device and the second PE device through multi chassis trunk MC-trunk links, a port that is of the first PE device and that is connected to the CE device is in an activated state, a port that is of the second PE device and that is connected to the CE device is in a deactivated state, and the first PE device and the second PE device each communicate with the third PE device through virtual extensible local area network VXLAN tunnels, where the first PE device is configured to: determine, based on a case in which a first fault detection packet from the CE device is not received within a preset period, that a fault occurs on a link between the first PE device and the CE device, switch the port that is of the first PE device and that is connected to the CE device from the activated state to the deactivated state, and stop sending a port status packet to the second PE device, where the port status packet is used to indicate that the port that is of the first PE device and that is connected to the CE device is in a normal state; and send a Media Access Control MAC entry update packet to the third PE device, where the MAC entry update packet is used to instruct the third PE device to delete a first MAC entry whose packet forwarding destination address is the first PE device; and the second PE device is configured to: determine, based on a case in which a port status packet sent by the first PE device is not received within a preset period, that a fault occurs on the link between the first PE device and the CE device or a fault occurs on the first PE device, and switch the port that is of the second PE device and that is connected to the CE device from the deactivated state to the activated state, where the port status packet is used to indicate that the port that is of the first PE device and that is connected to the CE device is in a normal state.

In a possible design, the network system further includes a control device; and the first PE device is configured to send the MAC entry update packet to the control device, where the MAC entry update packet is a notification message, the notification message is used to instruct the control device to generate a Media Access Control-withdraw MAC-withdraw packet and send the MAC-withdraw packet to the third PE device, and the MAC-withdraw packet is used to instruct the third PE device to delete the first MAC entry whose packet forwarding destination address is the first PE device and generate, through learning, a second MAC entry whose packet forwarding destination address is the second PE device; and correspondingly, the control device is configured to: generate the MAC-withdraw packet based on the notification message, and send the MAC-withdraw packet to the third PE device, where the MAC-withdraw packet is used to instruct the third PE device to delete the first MAC entry whose packet forwarding destination address is the first PE device and generate, through learning, the second MAC entry whose packet forwarding destination address is the second PE device.

According to a fourteenth aspect, an embodiment of this application provides a non-volatile computer readable storage medium, configured to store a computer program. The computer program includes an instruction used to perform the method in the first aspect, the second aspect, the third aspect, the fourth aspect, any possible design of the first aspect, or any possible design of the third aspect.

DESCRIPTION OF EMBODIMENTS

Embodiments of this application provide a packet processing method, a device, and a network system. A provider edge (PE) device whose port status is an activated state and a PE device whose port status is a deactivated state are determined, through pre-negotiation between PE devices and a customer edge (CE) device, from PE devices connected to the CE device. In addition, when a fault occurs on a packet transmission link, a link can be rapidly restored by using the PE device whose port status is the deactivated state and that is determined through pre-negotiation, and reliability of a VXLAN network can be ensured.

The packet processing method disclosed in the embodiments of this application is described in detail by using the following specific embodiments.

Figure 1:
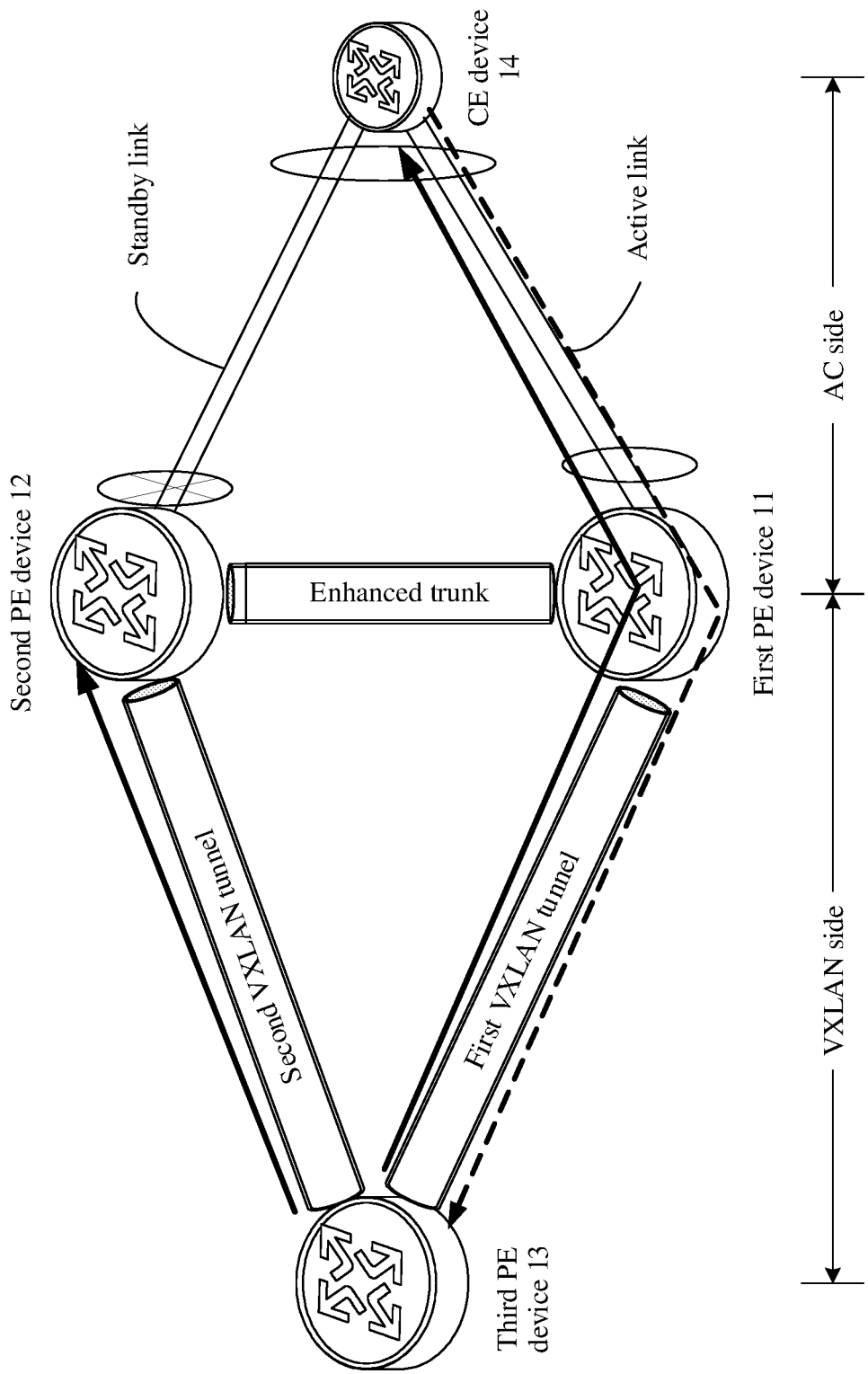
FIG. 1 is a schematic structural diagram of a network system according to an embodiment of this application.

FIG. 1 is a schematic structural diagram of a network system according to an embodiment of this application. The network system includes a first PE device 11, a second PE device 12, a third PE device 13, and a CE device 14.

The first PE device 11 and the second PE device 12 are interconnected, and may serve as VXLAN layer-3 gateways.

The first PE device 11 and the second PE device 12 are connected to the CE device 14 through multi chassis trunk (MC-Trunk) links. In addition, the first PE device 11 and the second PE device 12 negotiate with each other by running an enhanced trunk (E-Trunk) protocol, to specify that any access circuit (AC) side interface of the first PE device 11 and the second PE device 12 may be used to forward a packet to the CE device. It is determined through negotiation that one of the first PE device 11 and the second PE device 12 is used as a preferred device to forward a packet to the CE device 14, that is, an active device, and the other one is used as an alternative device to forward a packet to the CE device 14, that is, a standby device. In this embodiment of this application, it is determined through negotiation that a link between the first PE device 11 and the CE device 14 is an active link, and that a port that is of the first PE device 11 and that is connected to the CE device 14 is in an activated state. It is determined that a link between the second PE device 12 and the CE device 14 is a standby link, and a port that is of the second PE device 12 and that is connected to the CE device 14 is in a deactivated state. The first PE device and the second PE device each communicate with the third PE device through VXLAN tunnels.

The first PE device 11, the second PE device 12, and the third PE device 13 have different MAC addresses. For example, a MAC address of the first PE device 11 is 1.1.1.1, a MAC address of the second PE device 12 is 2.2.2.2, and a MAC address of the third PE device 13 is 3.3.3.3. The first PE device 11 and the second PE device 12 are separately connected to the third PE device 13 through VXLAN tunnels, and exchange packets with the third PE device through the VXLAN tunnels. The exchanged packets are encapsulated by using VXLAN packets. For example, a VXLAN tunnel connecting the third PE device 13 and the first PE device 11 is referred to as a first VXLAN tunnel. A VXLAN tunnel connecting the third PE device 13 and the second PE device 12 is referred to as a second VXLAN tunnel.

Optionally, the first PE device 11 and the second PE device 12 establish neighboring relationships with the third PE device 13 based on an Ethernet virtual private network (EVPN) protocol. For a basic principle of the EVPN protocol, refer to the Border Gateway Protocol (BGP), and for details, refer to RFC 7432 protocol.

In this embodiment of this application, for ease of description, AC sides are sides that are of the first PE device and the second PE device and that are connected to the CE device. Interfaces that are disposed on the first PE device and the second PE device and that are used to connect to the CE device are referred to as AC side interfaces. Sides that are of the first PE device and the second PE device and that are separately connected to the third PE device are network sides. Interfaces that are disposed on the first PE device and the second PE device and that are used to connect to the third PE device are referred to as VXLAN tunnel interfaces, and include a layer-2 Ethernet local area network (LAN) side interface and a layer-3 Ethernet wide area network (WAN) side interface.

Based on the network system shown in FIG. 1, when a network is stable, each device learns a MAC entry in a packet transmission process. The learning a MAC entry means that after receiving a packet, the device records a correspondence between a source MAC address and a receiving interface of the packet in a MAC table.

A process in which each device performs uplink transmission on a broadcast, unknown unicast, and multicast (BUM) packet is shown by solid arrows "→" in FIG. 1. An uplink refers to a process of transmitting a packet from a user to a network.

A specific uplink packet transmission process is as follows. The third PE device copies a BUM packet whose destination MAC address is the CE device, to obtain two BUM packets, forwards one BUM packet to the first PE device through the first VXLAN tunnel, and forwards the other BUM packet to the second PE device through the second VXLAN tunnel. The port that is of the second PE device and that is connected to the CE device is in the deactivated state, and then, the second PE device discards the BUM packet. The port that is of the first PE device and that is connected to the CE device is in the activated state, and the first PE device forwards the BUM packet to the CE device. The first PE device obtains, through learning, the MAC address of the third PE device, and an outbound interface directs to the first VXLAN tunnel established between the first PE device and the third PE device. The CE device receives the BUM packet, and obtains, through learning, the MAC address of the third PE device. An outbound interface directs to the active link established between the CE device and the first PE device. The third PE device generates a first MAC entry whose packet forwarding destination address is the first PE device and that is for transmitting a packet to the CE device.

In the foregoing uplink BUM packet transmission process, the first PE device can obtain, through learning, the MAC address used to connect to the third PE device, and determine that a connection interface directs to the first VXLAN tunnel established between the first PE device and the third PE device. The CE device also obtains, through learning, a MAC address used to connect to the third PE device, and determines that a connection interface directs to the link, that is, the active link, established between the CE device and the first PE device. The port that is of the first PE device and that is connected to the CE device is in the activated state, that is, an interface between the CE device and the first PE device is in the activated state.

Based on the structure of the network system disclosed in this application, when the network system is in a stable state, a process of performing, by each device, downlink transmission on a BUM packet or a unicast packet is shown by a dashed arrow "----▶" shown in FIG. 1. A downlink refers to a process of transmitting a packet from a network to a user.

The downlink packet transmission process is as follows. The CE device sends, to the first PE device by using the found MAC address of the first PE device and the active link to which the connection interface directs, the BUM packet or the unicast packet that is sent in downlink transmission. The first PE device forwards, to the third PE device by using the found MAC address of the third PE device and the first VXLAN tunnel to which the connection interface directs, the BUM packet or the unicast packet that is sent in downlink transmission. The third PE device receives the BUM packet or the unicast packet that is sent in downlink transmission and that is forwarded by the first PE device, and generates, through learning, the first MAC entry whose packet forwarding destination address is the first PE device and that is for transmitting a packet to the CE device.

In the downlink BUM packet or unicast packet transmission process, the first PE device obtains, through learning, a MAC entry of the access-side CE device. An interface in the MAC entry directs to a port/interface that is of the first PE device and that is connected to the CE device, and the port/interface is in the activated state. The third PE device also obtains, through learning, a MAC entry of the access-side CE device, and an interface in the MAC entry directs to the first VXLAN tunnel established between the third PE device and the first PE device.

Based on the structure of the network system disclosed in this application, when the network system is in the stable state, a process in which each device performs uplink transmission on a unicast packet is as follows.

The third PE device sends a unicast packet that is sent in uplink transmission and whose destination MAC address is the CE device. The third PE device sends, to the first PE device through the first VXLAN tunnel based on the first MAC entry that is obtained through learning based on the downlink BUM packet or unicast packet, the unicast packet that is sent in uplink transmission. The first PE device forwards the unicast packet to the CE device based on the MAC address of the CE device obtained through learning. The link between the first PE device and the CE device is the active link, and the port that is of the first PE device and that is connected to the CE device is in the activated state.

It should be noted that, in FIG. 1 disclosed in the embodiments of this application, the first PE device, the second PE device, and the third PE device may be specifically VXLAN tunnel end points (VTEP), and one VTEP may be connected to a plurality of virtual machines (VM). The VM may run in a server. One server may include at least one VM. Different VMs may belong to different VXLAN network segments. In an application scenario of the VXLAN, a VTEP device may also be referred to as a network virtualization edge (NVE) device. In some application scenarios, the VTEP device is understood as a module integrated into the NVE device. In the embodiments of this application, unless otherwise specially stated, the VTEP device is equivalent to the NVE device.

Figure 2:
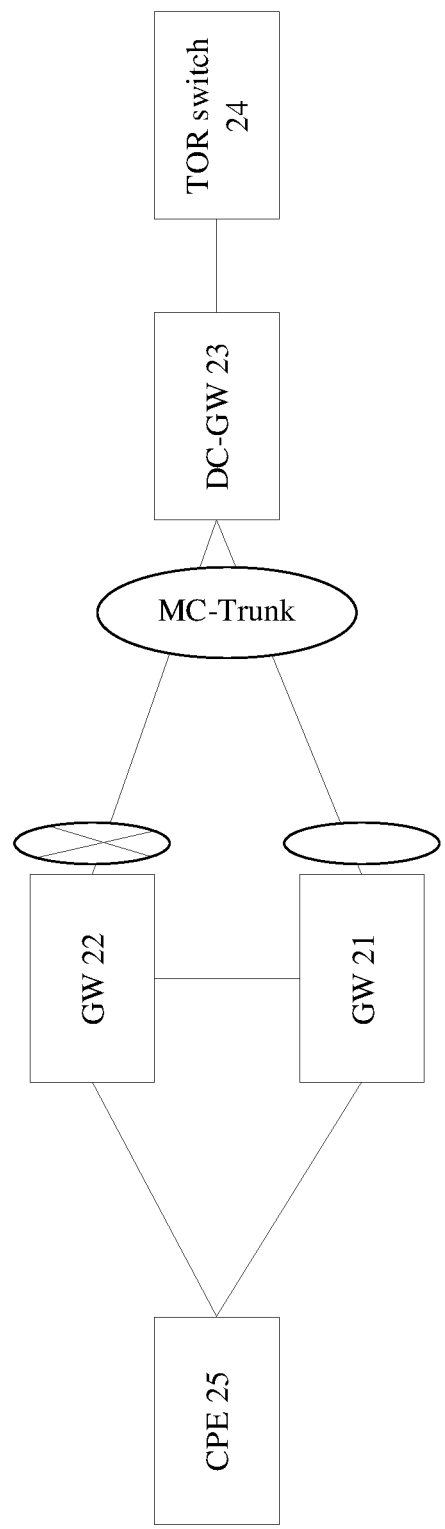
FIG. 2 is a schematic structural diagram of another network system according to an embodiment of this application.

FIG. 2 is a schematic structural diagram of a network system in a specific application according to an embodiment of this application. The network system includes a first gateway (GW) 21, a second GW 22, a data center gateway DC-GW) 23, a top of rack (TOR) switch 24, a VM 25, customer-premises equipment (CPE) 26, and a VM 27.

In this specific application, the first GW 11 may be the first PE device 11 shown in FIG. 1. The second GW 22 may be the second PE device 12 shown in FIG. 1. A combination of the DC-GW 23, the TOR switch 24, and the VM 25 may be the CE device shown in FIG. 1. A combination of the CPE 26 and the VM 27 that accesses a network through the CPE 26 may be the third PE device shown in FIG. 1. For specific disposing of each device and uplink and downlink packet transmission processes, refer to the corresponding descriptions in FIG. 1, and details are not described herein again.

With reference to FIG. 1 and FIG. 2, an embodiment of this application discloses a packet processing method, to rapidly restore an original active link on which a fault occurs, and ensure reliability of a VXLAN network. Further, a PE device via which a third PE device transmits a packet to a CE device is designated, so that consistency between a transmission direction of an uplink packet and a transmission direction of a downlink packet can be ensured.

Based on different faults occurring in a first PE device used as an active device, a route needs to be switched to ensure rapid link restoration. For example, a fault occurs on an AC side of the first PE device, a fault occurs on a network side of the first PE device or on the first PE device.

Figure 3:
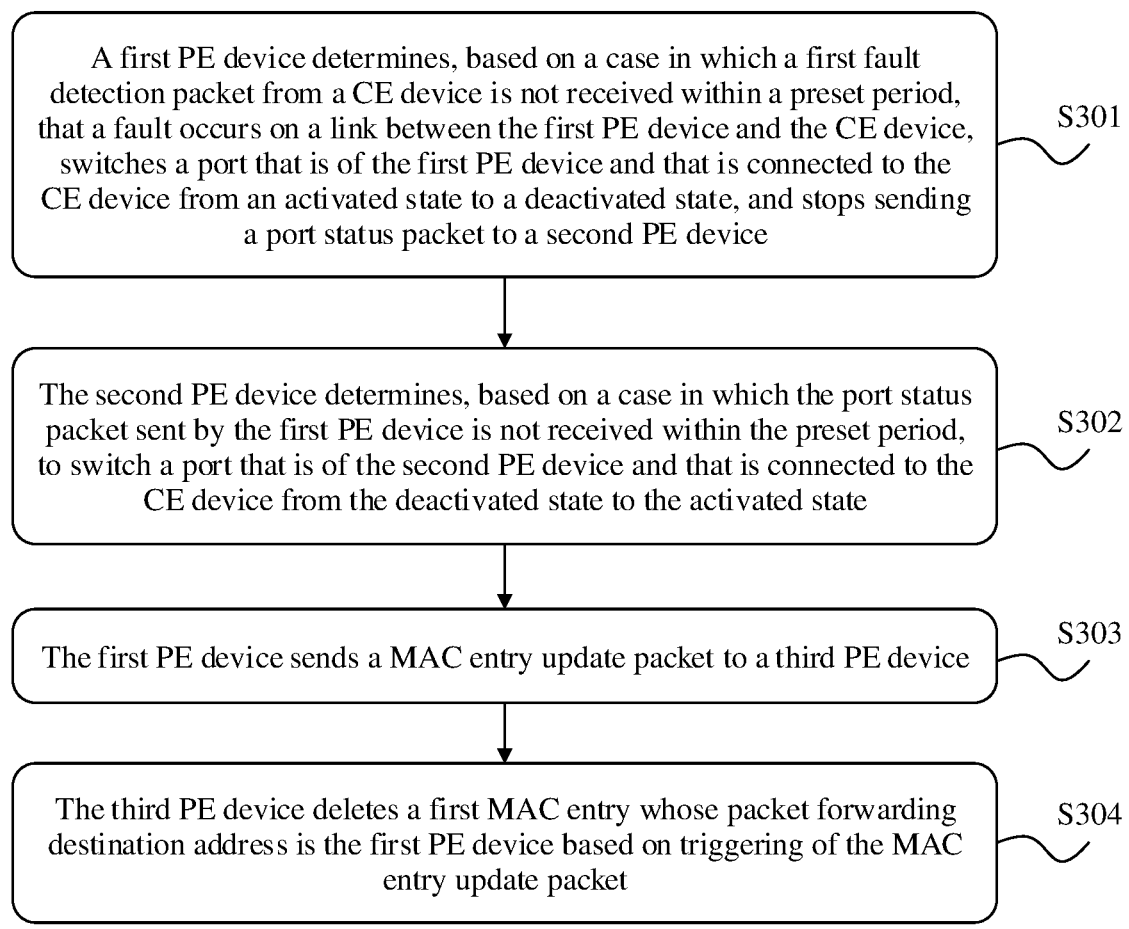
FIG. 3 is a schematic flowchart of a packet processing method according to an embodiment of this application.

When a fault occurs on the AC side of the first PE device, a process of the packet processing method is shown in FIG. 3, and includes the following steps.

S301: The first PE device determines, based on a case in which a first fault detection packet from the CE device is not received within a preset period, that a fault occurs on a link between the first PE device and the CE device, switches a port that is of the first PE device and that is connected to the CE device from an activated state to a deactivated state, and stops sending a port status packet to a second PE device.

The CE device is dual-homed to the first PE device and the second PE device through MC-trunk links, and the CE device and the first PE device exchange, within the preset period, fault detection packets used to detect whether a fault occurs. If the first PE device does not receive, within the preset period, the first fault detection packet sent by the CE device, the first PE device may determine that a fault occurs on the link between the first PE device and the CE device. In this case, the first PE device switches the port that is of the first PE device and that is connected to the CE device from the activated state to the deactivated state.

The first PE device stops sending the port status packet to the second PE device based on a case in which an abnormality occurs in the status of the port that is of the first PE device and that is connected to the CE device. The port status packet is used to indicate that the port that is of the first PE device and that is connected to the CE device is in a normal state.

It should be noted that in a specific application process, if an abnormality or a fault occurs on the link between the first PE device and the CE device, the first PE device stops sending the port status packet to the second PE device. In addition, if a fault occurs on the first PE device, the first PE device also stops sending the port status packet to the second PE device.

S302: The second PE device determines, based on a case in which the port status packet sent by the first PE device is not received within the preset period, to switch a port that is of the second PE device and that is connected to the CE device from the deactivated state to the activated state.

In a specific application process, if the second PE device does not receive, within the preset period, the port status packet sent by the first PE device, the second PE device may determine that a fault occurs on the link between the first PE device and the CE device, or determine that a fault occurs on the first PE device. In this case, the second PE device switches the port that is of the second PE device and that is connected to the CE device from the deactivated state to the activated state. After the switching, the link between the second PE device and the CE device is upgraded from an original standby link to an active link.

S303: The first PE device sends a MAC entry update packet to the third PE device.

In a process of performing S303, the first PE device may send the MAC entry update packet to the third PE device by using another device in a same network system, or may directly send the MAC entry update packet to the third PE device. The MAC entry update packet is used to instruct the third PE device to delete a first MAC entry whose packet forwarding destination address is the first PE device.

For example, the another device herein may be specifically the second PE device.

It should be noted that there is no particular sequence between S302 and S303.

S304: The third PE device deletes a first MAC entry whose packet forwarding destination address is the first PE device based on triggering of the MAC entry update packet.

After the third PE device deletes the first MAC entry whose packet forwarding destination address is the first PE device, the third PE device generates, through learning based on a MAC address learning process in the descriptions of the embodiment corresponding to FIG. 1, a second MAC entry whose packet forwarding destination address is the second PE device.

In this embodiment of this application, the CE device is dual-homed to the first PE device and the second PE device through the MC-trunk links. The first PE device and the second PE device negotiate with each other by running an enhanced trunk (E-Trunk) protocol, to determine that the port that is of the first PE device and that is connected to the CE device is in the activated state and that the port that is of the second PE device and that is connected to the CE device is in the deactivated state. When the port that is of the first PE device and that is connected to the CE device is switched from the activated state to the deactivated state, the second PE device switches the port that is of the second PE device and that is connected to the CE device from the deactivated state to the activated state. The first PE device sends the MAC entry update packet to the third PE device, to trigger the third PE device to delete the first MAC entry whose packet forwarding destination address is the first PE device, generate, through learning, the second MAC entry whose packet forwarding destination address is the second PE device, and forward a packet based on the second MAC entry. Therefore, after a fault occurs on a PE device, where a port that is of the PE device and that is connected to the CE device is in the activated state, a route is rapidly switched to a standby PE device to restore a link to forward a packet, so that reliability of the VXLAN network is ensured. Further, a new packet forwarding destination address is designated, so that consistency between a transmission direction of an uplink packet and a transmission direction of a downlink packet is ensured, helping a firewall to detect a packet.

In this embodiment of this application, when the first PE device determines that a fault occurs on an AC side link connected to the CE device, when a packet processing process shown in FIG. 3 is performed, specific processes of S303 and S304 may be implemented in a plurality of manners, and detailed descriptions are provided below.

Based on the network system shown in FIG. 1, an EVPN peer relationship is established between every two of the first PE device, the second PE device, and the third PE device.

Figure 4:
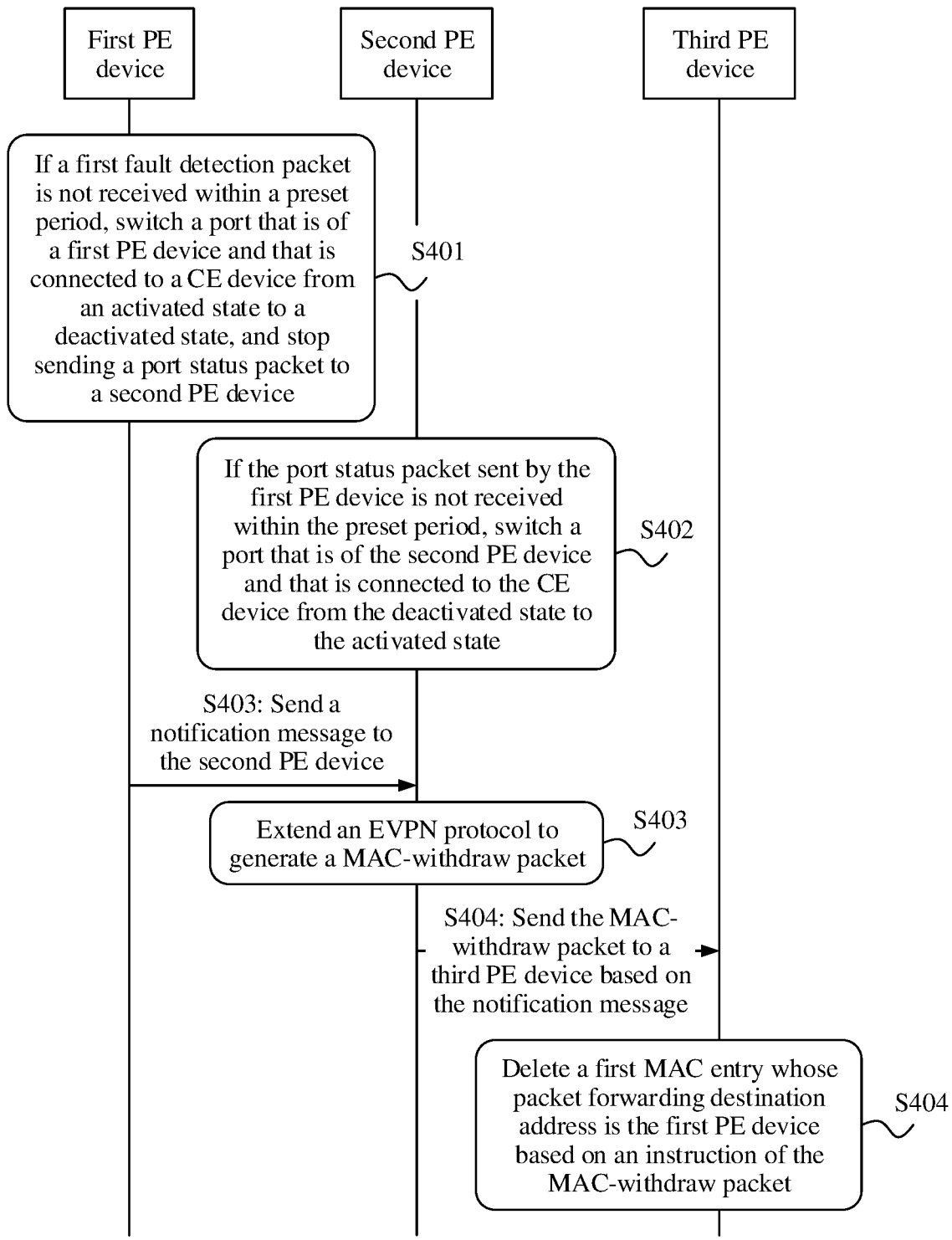
FIG. 4 is a schematic flowchart of another packet processing method according to an embodiment of this application.

In a specific application instance, the MAC entry update packet is a notification message. The first PE device sends the MAC entry update packet to the third PE device via the second PE device. As shown in FIG. 4, the packet processing process is as follows.

S401: If the first PE device does not receive a first fault detection packet from the CE device within a preset period, the first PE device determines that a fault occurs on a link between the first PE device and the CE device, switches a port that is of the first PE device and that is connected to the CE device from an activated state to a deactivated state, and stops sending a port status packet to the second PE device.

S402: If the second PE device does not receive, within the preset period, the port status packet sent by the first PE device, the second PE device switches a port that is of the second PE device and that is connected to the CE device from the deactivated state to the activated state.

S403: The first PE device sends a notification message to the second PE device.

The notification message is used to instruct the second PE device to send, to the third PE device by using an Ethernet virtual private network EVPN protocol, a second MAC-withdraw packet that is generated by extending an advertisement message in the EVPN protocol.

S404: The second PE device extends an EVPN protocol to generate a MAC-withdraw packet, and sends the MAC-withdraw packet to the third PE device based on the notification message.

It should be noted that the second PE device may extend the EVPN protocol after switching the port that is of the second PE device and that is connected to the CE device from the deactivated state to the activated state. The second PE device may alternatively extend the EVPN protocol after receiving the notification message sent by the first PE device.

S405: The third PE device receives the MAC-withdraw packet, and the third PE device deletes a first MAC entry whose packet forwarding destination address is the first PE device based on an instruction of the MAC-withdraw packet.

After deleting the first MAC entry whose packet forwarding destination address is the first PE device, the third PE device generates, through learning, a second MAC entry whose packet forwarding destination address is the second PE device.

In a specific application process, the second PE device extends, in two manners, the EVPN protocol to generate the MAC-withdraw packet.

In a first manner, the second PE device extends an Ethernet auto-discovery per Ethernet segment (Ethernet A-D per ES) route in the EVPN protocol to generate a first MAC-withdraw packet, and sends the first MAC-withdraw packet to the third PE device based on the notification message.

Four route types are defined in RFC 7432. The Ethernet A-D per ES route is a type-1 route, and may be briefly referred to as an AD route. In this embodiment of this application, any route that uses the AD route may be considered as the Ethernet A-D per ES route.

Specifically, the extending the Ethernet A-D per ES route in the EVPN protocol is as follows. The second PE device configures an ESI based on a BD, to identify a broadcast domain BD-based type-1 route that is published to the third PE device. The AD route carries a layer 2 attributes extended community attribute, and a first bit in a control field of the attribute is set, to identify the route as a BD-based MAC-flush route. The AD route is delivered to a broadcast domain corresponding to the third PE device, where RT information configured for the BD matches RT information carried in the AD route.

Therefore, if the third PE device receives the extended AD route, the third PE device flushes the first MAC entry corresponding to the BD.

In a second manner, the second PE device extends an advertisement message in the EVPN protocol to generate a second MAC-withdraw packet, and sends the second MAC-withdraw packet to the third PE device based on the notification message.

Specifically, for the advertisement message in the EVPN protocol, refer to a notification message in the BGP protocol. A specific principle of the notification message is as follows. When the device detects an error status, the device sends a notification message to a peer, and then a BGP connection is immediately interrupted.

The second PE device extends the advertisement message, so that the advertisement message carries withdraw information that is used to instruct the third PE device to delete the first MAC entry whose packet forwarding destination address is the first PE device; and correspondingly generates the first MAC-withdraw packet.

In this embodiment of this application, the first PE device sends the MAC entry update packet used as the notification message to the second PE device, to instruct the second PE device to generate the MAC-withdraw packet and send the MAC-withdraw packet to the third PE device based on the EVPN protocol, so that the third PE device deletes the corresponding MAC entry based on the MAC-withdraw packet, and then re-learns a route of sending a packet to the CE device via the second PE device, to rapidly restore link transmission and improve security of the VXLAN network.

Figure 5:
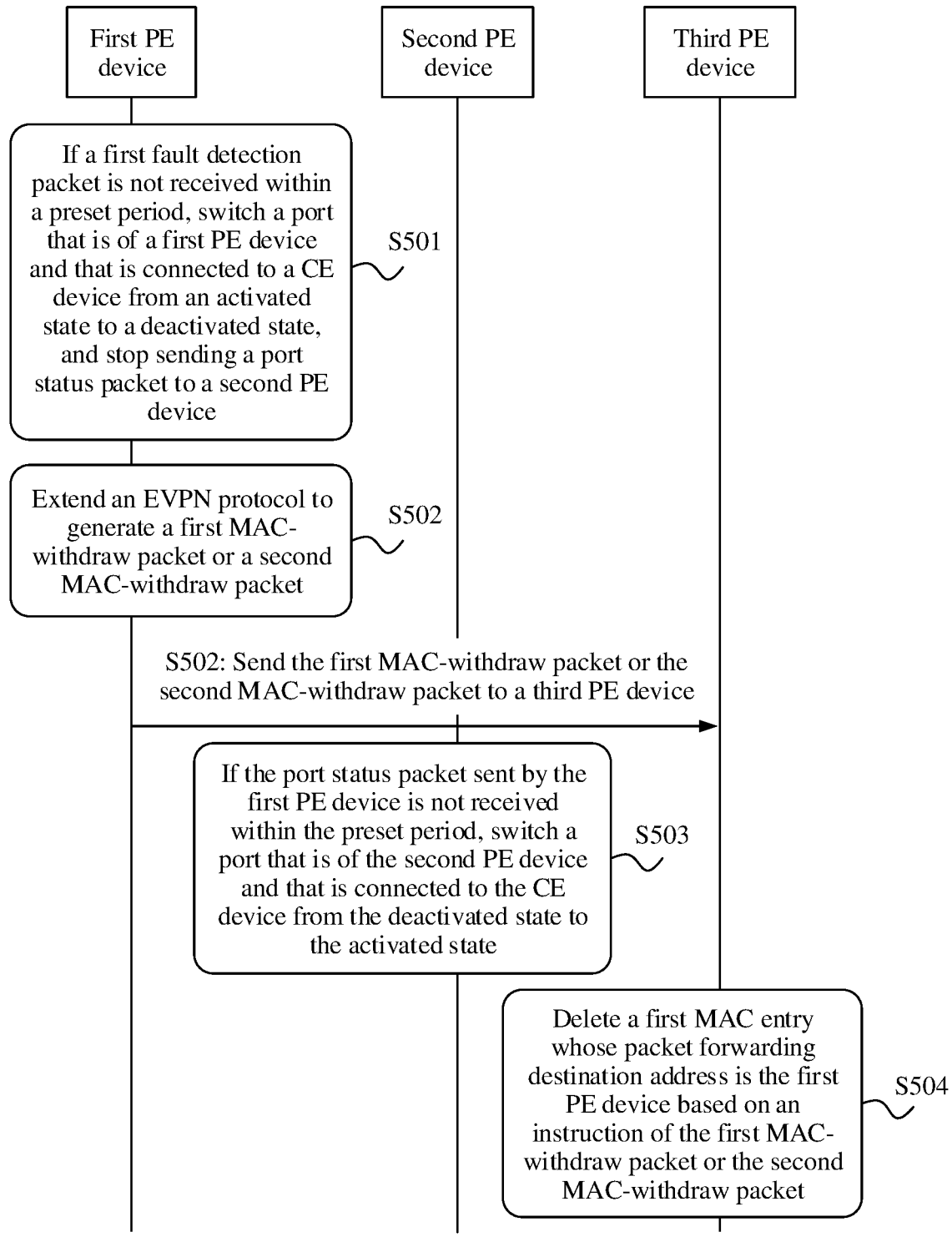
FIG. 5 is a schematic flowchart of another packet processing method according to an embodiment of this application.

In a specific application instance, the MAC entry update packet may be directly used as a MAC-withdraw packet, and the first PE device directly sends the MAC-withdraw packet to the third PE device. As shown in FIG. 5, the packet processing process is as follows.

S501: If the first PE device does not receive a first fault detection packet from the CE device within a preset period, the first PE device determines that a fault occurs on a link between the first PE device and the CE device, switches a port that is of the first PE device and that is connected to the CE device from an activated state to a deactivated state, and stops sending a port status packet to the second PE device.

S502: The first PE device extends an Ethernet A-D per ES route in an EVPN protocol to generate a first MAC-withdraw packet, or extends advertisement message in an EVPN protocol to generate a second MAC-withdraw packet, and sends the first MAC-withdraw packet or the second MAC-withdraw packet to the third PE device.

A manner in which the first PE device extends the Ethernet A-D per ES route in the EVPN protocol is consistent with a manner in which the second PE device extends the Ethernet A-D per ES route in the EVPN protocol. A manner in which the first PE device extends the advertisement message in the EVPN protocol is consistent with a manner in which the second PE device extends the advertisement message in the EVPN protocol. Details are not described herein again.

S503: If the second PE device does not receive, within the preset period, the port status packet sent by the first PE device, the second PE device switches a port that is of the second PE device and that is connected to the CE device from the deactivated state to the activated state.

It should be noted that a sequence of a process of actually performing S502 and S503 is not limited in this embodiment of this application.

S504: The third PE device receives the first MAC-withdraw packet, and the third PE device deletes a first MAC entry whose packet forwarding destination address is the first PE device based on an instruction of the first MAC-withdraw packet, or the third PE device receives the second MAC-withdraw packet, and the third PE device deletes a first MAC entry whose packet forwarding destination address is the first PE device based on an instruction of the second MAC-withdraw packet.

After deleting the first MAC entry whose packet forwarding destination address is the first PE device, the third PE device generates, through learning, a second MAC entry whose packet forwarding destination address is the second PE device.

Optionally, based on the network system disclosed in FIG. 1 in the embodiments of this application, if a fault occurs on the first PE device, the first PE device no longer sends port status information to the second PE device, and the second PE device switches the port that is of the second PE device and that is connected to the CE device from the deactivated state to the activated state. In this case, the second PE device may generate a corresponding MAC-withdraw packet in a manner of extending the EVPN protocol. The second PE device sends the generated MAC-withdraw packet to the third PE device based on the EVPN protocol, and the third PE device deletes the first MAC entry whose packet forwarding destination address is the first PE device based on the instruction of the MAC-withdraw packet, and then generates, through learning, the second MAC entry whose packet forwarding destination address is the second PE device.

Figure 6:
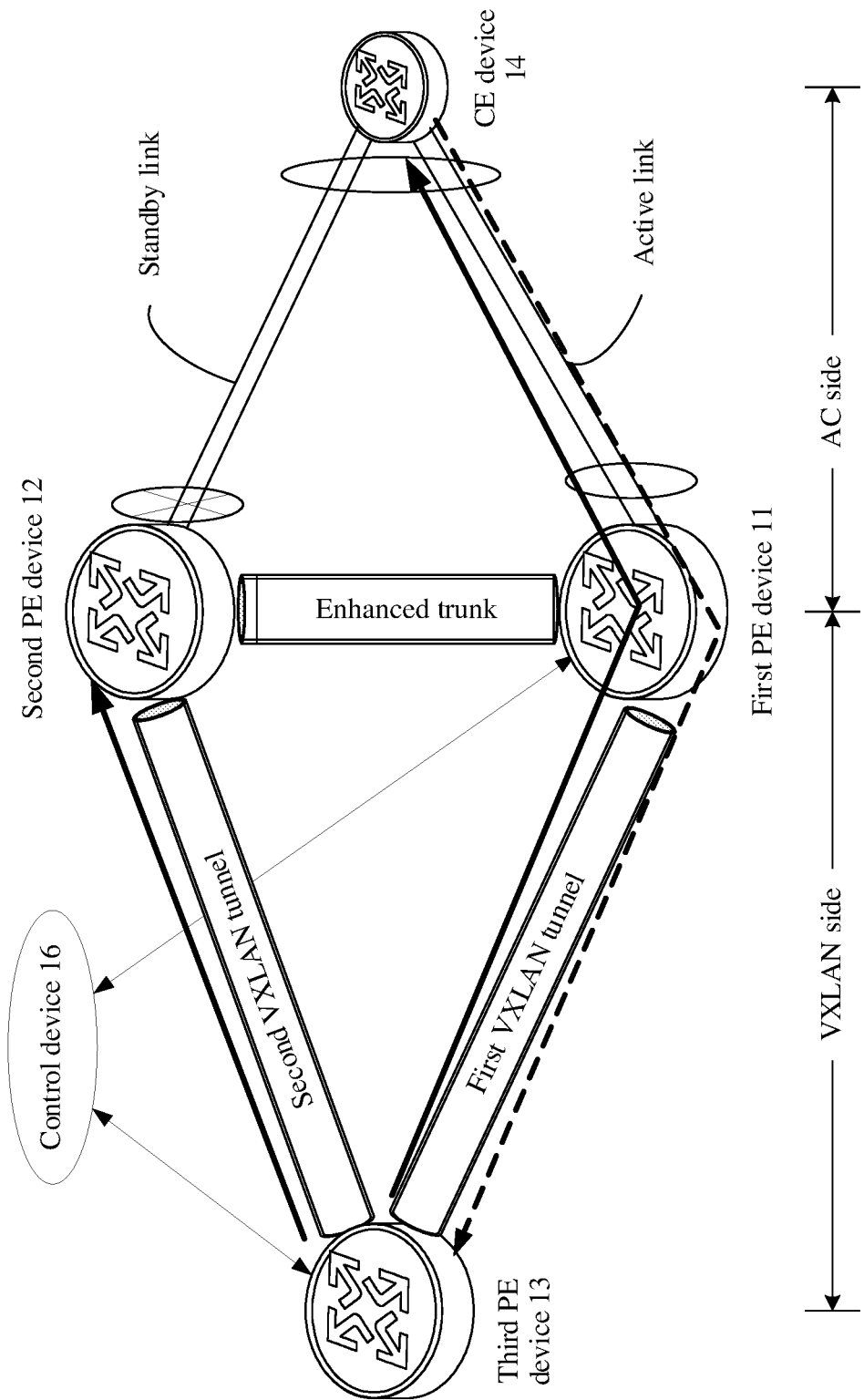
FIG. 6 is a schematic structural diagram of another network system according to an embodiment of this application.
Figure 7A:
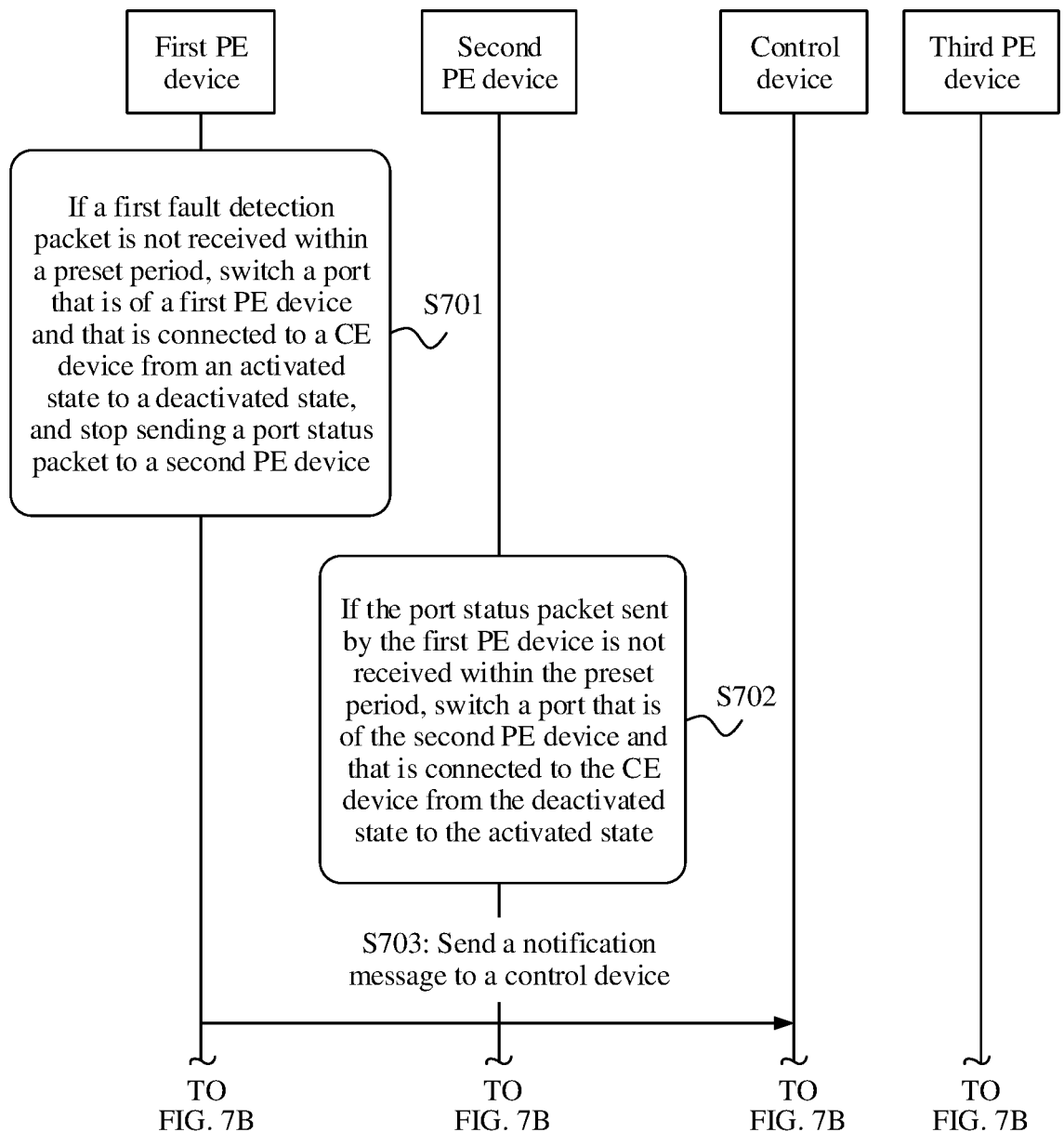
FIG. 7A and FIG. 7B are a schematic flowchart of another packet processing method according to an embodiment of this application.
Figure 7B:
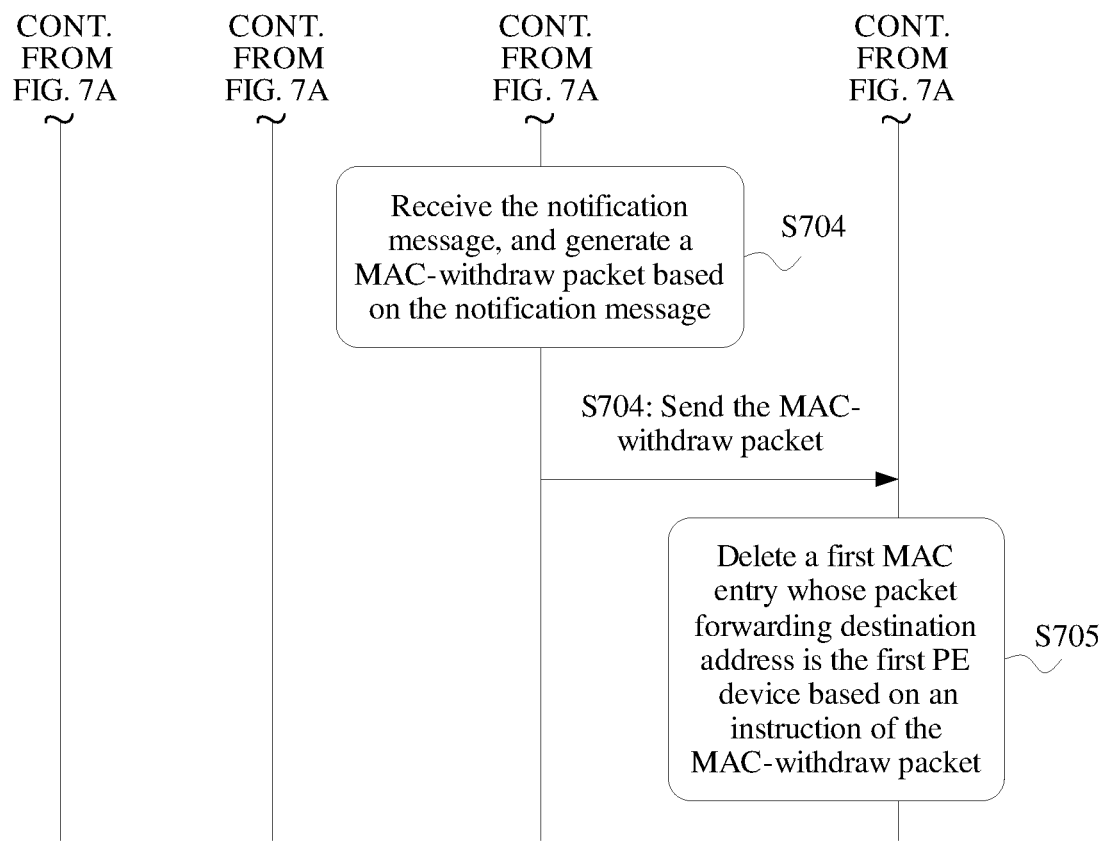

Optionally, based on the network system disclosed in FIG. 1 in the embodiments of this application, as shown in FIG. 6, a control device 15 is added based on the network system shown in FIG. 1. A MAC entry update packet sent by the first PE device to the third PE device is a notification message. The packet processing process is shown in FIG. 7A and FIG. 7B, and includes the following steps.

S701: If the first PE device does not receive a first fault detection packet from the CE device within a preset period, the first PE device determines that a fault occurs on a link between the first PE device and the CE device, switches a port that is of the first PE device and that is connected to the CE device from an activated state to a deactivated state, and stops sending a port status packet to the second PE device.

S702: If the second PE device does not receive, within the preset period, the port status packet sent by the first PE device, the second PE device switches a port that is of the second PE device and that is connected to the CE device from the deactivated state to the activated state.

S703: The first PE device sends a notification message to the control device.

The notification message is used to instruct the control device to generate a Media Access Control-withdraw (MAC-Withdraw) packet and send the MAC-withdraw packet to the third PE device.

S704: The control device receives the notification message sent by the first PE device, generates the MAC-withdraw packet based on the notification message, and sends the MAC-withdraw packet to the third PE device.

S705: The third PE device receives the MAC-withdraw packet, and deletes a first MAC entry whose packet forwarding destination address is the first PE device based on an instruction of the MAC-withdraw packet.

After deleting the first MAC entry whose packet forwarding destination address is the first PE device, the third PE device generates, through learning, a second MAC entry whose packet forwarding destination address is the second PE device.

In this embodiment of this application, the first PE device sends the MAC entry update packet used as the notification message to the control device, to instruct the control device to generate the MAC-withdraw packet and send the MAC-withdraw packet to the third PE device, so that the third PE device deletes the corresponding MAC entry based on the MAC-withdraw packet, and then re-learns a route of sending a packet to the CE device via the second PE device, to rapidly restore link transmission and improve security of the VXLAN network.

Optionally, based on the network system disclosed in FIG. 1 in the embodiments of this application, a bidirectional forwarding detection (BFD) session is established between the first PE device, the second PE device, and the third PE device.

For example, after the BFD session is established between the devices, actually, connection interfaces between the devices are configured as associated. If no fault occurs, the BFD session is in an up (UP) state, or if a fault occurs, the BFD session is adjusted to a down (Down) state. After the interfaces are configured as associated, a BFD down packet is immediately reported to a corresponding interface, so that the corresponding interface enters a BFD down state.

Figure 8:
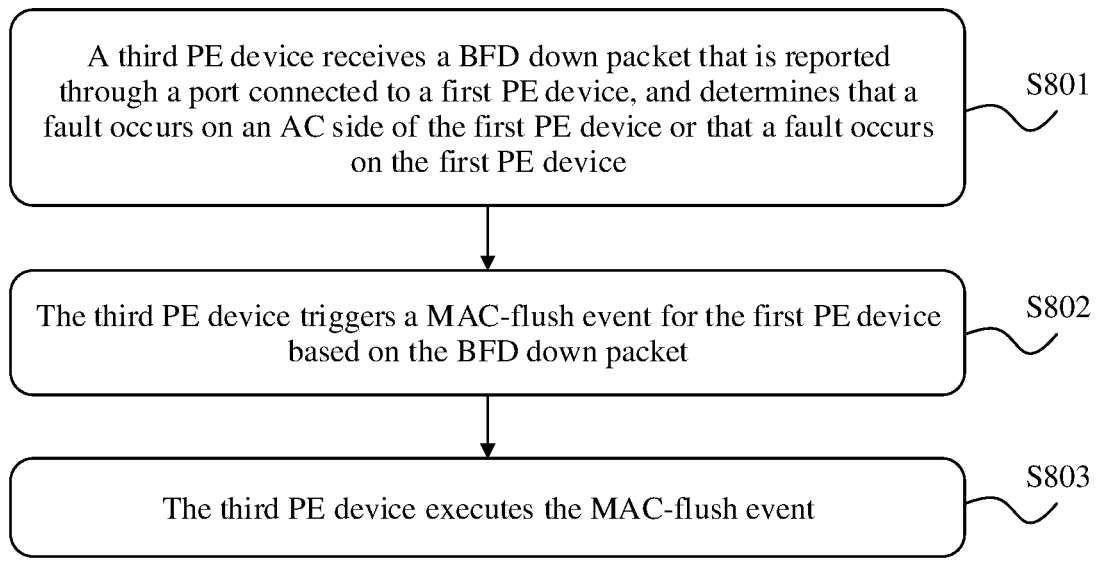
FIG. 8 is a schematic flowchart of another packet processing method according to an embodiment of this application.

As shown in FIG. 8, if a fault occurs on the VXLAN tunnel between the first PE device and the third PE device, the packet processing process includes the following steps.

S801: The third PE device receives a BFD down packet that is reported through a port connected to the first PE device, and determines that a fault occurs on an AC side of the first PE device or that a fault occurs on the first PE device.

In this embodiment of this application, based on a relationship of the BFD session established between the first PE device and the third PE device, when a fault occurs on the first PE device, a WAN-side BFD session between the first PE device and the third PE device is interrupted. The third PE device receives the BFD down packet that is reported through the port connected to the first PE device.

The BFD down packet may be used to instruct the third PE device to execute a Media Access Control flush (MAC-flush) event for the first PE device.

S802: The third PE device triggers a MAC-flush event for the first PE device based on the BFD down packet.

S803: The third PE device executes the MAC-flush event.

A specific operation of executing, by the third PE device, the MAC-flush event is: deleting a first MAC entry whose packet forwarding destination address is the first PE device.

Based on the network system disclosed in FIG. 1 in the embodiments of this application, the first PE device and the second PE device both receive a packet sent by the third PE device. When no fault occurs, the first PE device is used as an active device, and forwards, to the CE device, the packet that is received through the VXLAN tunnel established with the third PE device, and the second PE device is used as an alternative device and does not forward a packet.

When a fault occurs on the WAN side, the packet sent by the third PE device to the CE device is forwarded to the first PE device via the second PE device, and then the first PE device sends the packet to the CE device.

S804: The third PE device sends a packet to the CE device via the second PE device and the first PE device.

In this embodiment of this application, when a fault occurs on the first PE device, the WAN-side BFD session between the first PE device and the third PE device is interrupted. The third PE device receives the BFD down packet that is reported through the port connected to the first PE device. The third PE device performs, based on the BFD down packet, the operation of deleting the first MAC entry whose packet forwarding destination address is the first PE device, and then enables a sent packet to pass through the second PE device to arrive at the first PE device, to rapidly restore link transmission and improve security of the VXLAN network.

Based on the packet processing method disclosed in this embodiment of this application, the embodiments of this application further separately disclose a first PE device, a second PE device, and a third PE device that separately perform the packet processing method.

The first PE device, the second PE device, and the third PE device disclosed in the embodiments of this application, and a CE device are located in a same network system. The CE device is dual-homed to the first PE device and the second PE device through MC-trunk links. A port that is of the first PE device and that is connected to the CE device is in an activated state, and a port that is of the second PE device and that is connected to the CE device is in a deactivated state. The first PE device and the second PE device each communicate with the third PE device through VXLAN tunnels.

Figure 9:
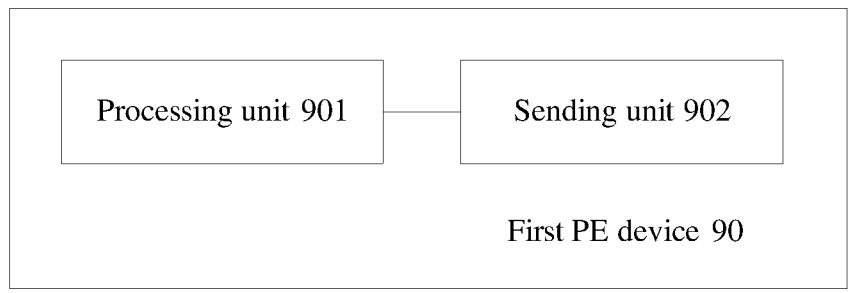
FIG. 9 is a schematic structural diagram of a first PE device according to an embodiment of this application.

FIG. 9 is a schematic structural diagram of a first PE device 90 according to an embodiment of this application. The first PE device 90 includes a processing unit 901, configured to: determine, based on a case in which a first fault detection packet from a CE device is not received within a preset period, that a fault occurs on a link between the first PE device and the CE device, switch a port that is of the first PE device and that is connected to the CE device from an activated state to a deactivated state, and stop sending a port status packet to a second PE device, where the port status packet is used to indicate that the port that is of the first PE device and that is connected to the CE device is in a normal state; and a sending unit 902, configured to send a MAC entry update packet to a third PE device, where the MAC entry update packet is used to instruct the third PE device to delete a first MAC entry whose packet forwarding destination address is the first PE device.

When the MAC entry update packet is a notification message, an EVPN peer relationship is established between every two of the first PE device, the second PE device, and the third PE device. Optionally, the sending unit 902 is configured to send the notification message to the second PE device, where the notification message is used to instruct the second PE device to send, to the third PE device by using an EVPN protocol, a first MAC-withdraw packet that is generated by extending an Ethernet A-D per ES route in the EVPN protocol. The first MAC-withdraw packet is used to instruct the third PE device to delete the first MAC entry whose packet forwarding destination address is the first PE device.

When the MAC entry update packet is a notification message, an EVPN peer relationship is established between every two of the first PE device, the second PE device, and the third PE device. Optionally, the sending unit 902 is configured to send the notification message to the second PE device, where the notification message is used to instruct the second PE device to send, to the third PE device by using an EVPN protocol, a second MAC-withdraw packet that is generated by extending an advertisement message in the EVPN protocol. The second MAC-withdraw packet is used to instruct the third PE device to delete the first MAC entry whose packet forwarding destination address is the first PE device.

When the MAC entry update packet is a first MAC-withdraw packet, an EVPN peer relationship is established between every two of the first PE device, the second PE device, and the third PE device. Optionally, the processing unit 901 is configured to extend an Ethernet A-D per ES route in an EVPN protocol to generate the first MAC-withdraw packet. The first MAC-withdraw packet is used to instruct the third PE device to delete the first MAC entry whose packet forwarding destination address is the first PE device.

Correspondingly, the sending unit 902 is configured to send the first MAC-withdraw packet to the third PE device by using the EVPN protocol.

When the MAC entry update packet is a second MAC-withdraw packet, an EVPN peer relationship is established between every two of the first PE device, the second PE device, and the third PE device. Optionally, the processing unit 901 is configured to extend an advertisement message in the EVPN protocol to generate the second MAC-withdraw packet. The second MAC-withdraw packet is used to instruct the third PE device to delete the first MAC entry whose packet forwarding destination address is the first PE device.

Correspondingly, the sending unit 902 is configured to send the second MAC-withdraw packet to the third PE device by using the EVPN protocol.

Further, if the network system further includes a control device, and the MAC entry update packet is a notification message, optionally, the sending unit 902 is configured to send the notification message to the control device. The notification message is used to instruct the control device to generate a MAC-withdraw packet and send the MAC-withdraw packet to the third PE device. The MAC-withdraw packet is used to instruct the third PE device to delete the first MAC entry whose packet forwarding destination address is the first PE device.

For execution processes of the units in the first PE device disclosed in this embodiment of this application, refer to records about the first PE device in the packet processing method in the embodiments of this application. Principles and execution manners are the same, and details are not described herein again.

Based on the packet processing method disclosed in the embodiments of this application, an embodiment of this application further correspondingly discloses a control device that performs the packet processing method.

Figure 10:
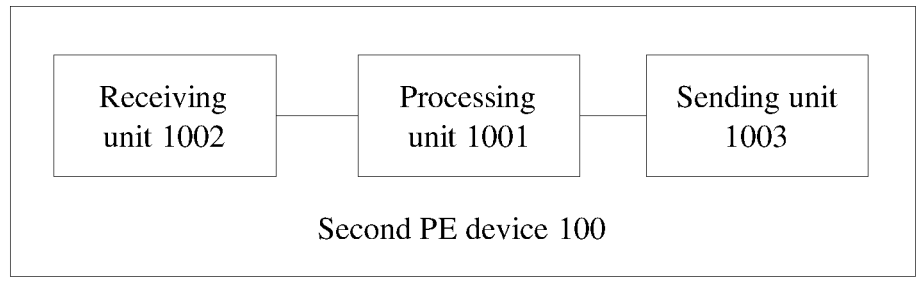
FIG. 10 is a schematic structural diagram of a second PE device according to an embodiment of this application.

FIG. 10 is a schematic structural diagram of a second PE device 100 according to an embodiment of this application. An EVPN peer relationship is established between a first PE device, the second PE device, and a third PE device. The second PE device 100 includes a processing unit 1001, a receiving unit 1002, and a sending unit 1003.

The processing unit 1001 is configured to: determine, based on a case in which a port status packet sent by the first PE device is not received within a preset period, that a fault occurs on a link between the first PE device and a CE device or a fault occurs on the first PE device, and switch a port that is of the second PE device and that is connected to the CE device from a deactivated state to an activated state, where the port status packet is used to indicate that a status of a port that is of the first PE device and that is connected to the CE device is normal.

The processing unit 1001 is further configured to extend an EVPN protocol packet to generate a MAC-withdraw packet, where the MAC-withdraw packet is used to instruct the third PE device to delete a first MAC entry whose packet forwarding destination address is the first PE device.

The MAC entry update packet is a notification message. The receiving unit 1002 is configured to receive the notification message sent by the first PE device, where the notification message is used to instruct the second PE device to send the MAC-withdraw packet to the third PE device by using an EVPN protocol.

The sending unit 1003 is configured to send the MAC-withdraw packet to the third PE device based on the notification message by using the EVPN protocol.

Optionally, the processing unit 1001 is configured to: extend an Ethernet A-D per ES route in the EVPN protocol to generate a first MAC-withdraw packet, and use the first MAC-withdraw packet as the MAC-withdraw packet.

Optionally, the processing unit 1001 is configured to: extend an advertisement message in the EVPN protocol to generate a second MAC-withdraw packet, and use the second MAC-withdraw packet as the MAC-withdraw packet.

For execution processes of the units in the second PE device disclosed in this embodiment of this application, refer to records about the second PE device in the packet processing method in the embodiments of this application. Principles and execution manners are the same, and details are not described herein again.

Based on the packet processing method disclosed in the embodiments of this application, an embodiment of this application further discloses a third PE device that performs the packet processing method.

Figure 11:
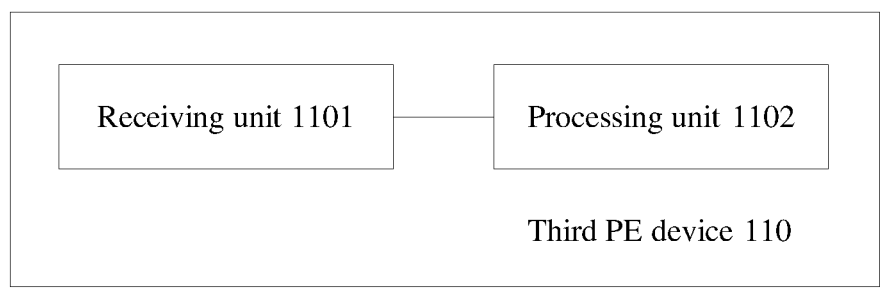
FIG. 11 is a schematic structural diagram of a third PE device according to an embodiment of this application.

FIG. 11 is a schematic structural diagram of a third PE device 110 according to an embodiment of this application. The third PE device 110 includes a receiving unit 1101, configured to receive a MAC-withdraw packet from a second PE device, or configured to receive a MAC-withdraw packet from a first PE device, or configured to receive a BFD down packet that is reported through a port connected to a first PE device, or configured to receive a MAC-withdraw packet sent by a control device; and a processing unit 1102, configured to: delete a first MAC entry whose packet forwarding destination address is the first PE device based on the MAC-withdraw packet, or trigger a MAC-flush event for the first PE device based on the BFD down packet.

A specific operation of executing, by the processing unit 1102, the MAC-flush event is: deleting the first MAC entry whose packet forwarding destination address is the first PE device.

For execution processes of the units in the third PE device disclosed in this embodiment of this application, refer to records about the third PE device in the packet processing method in the embodiments of this application. Principles and execution manners are the same, and details are not described herein again.

Based on the packet processing method disclosed in the embodiments of this application, an embodiment of this application further discloses a control device that performs the packet processing method.

Figure 12:
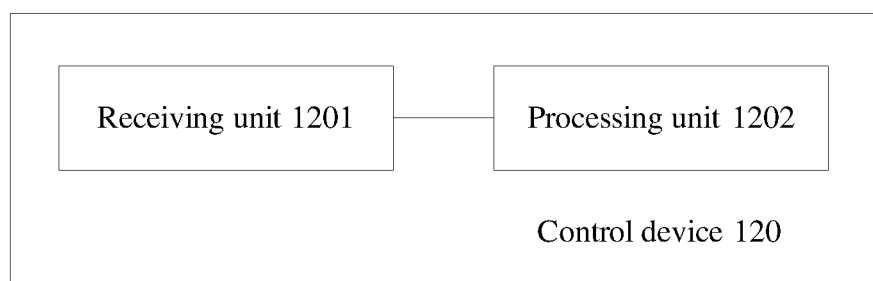
FIG. 12 is a schematic structural diagram of a control device according to an embodiment of this application.

FIG. 12 is a schematic structural diagram of a control device 120 according to an embodiment of this application. The control device 120, a first PE device, a second PE device, a third PE device, and a CE device are located in a same network system. The control device 120 includes a receiving unit 1201 and a processing unit 1202.

If a MAC entry update packet is a notification message, the receiving unit 1201 is configured to receive a notification message sent by the first PE device, where the notification message is used to instruct the control device to generate a MAC-withdraw packet and send the MAC-withdraw packet to the third PE device.

The processing unit 1202 is configured to: generate the MAC-withdraw packet based on the notification message, and send the MAC-withdraw packet to the third PE device, where the MAC-withdraw packet is used to instruct the third PE device to delete a first MAC entry whose packet forwarding destination address is the first PE device and generate, through learning, a second MAC entry whose packet forwarding destination address is the second PE device.

For execution processes of the units in the control device disclosed in this embodiment of this application, refer to records about the control device in the packet processing method in the embodiments of this application. Principles and execution manners are the same, and details are not described herein again.

With reference to the packet processing method disclosed in the embodiments of this application, the first PE device, the second PE device, the third PE device, and the control device that are disclosed in the embodiments of this application may be directly implemented by using hardware, a memory executed by a processor, or a combination of the two.

Figure 13:
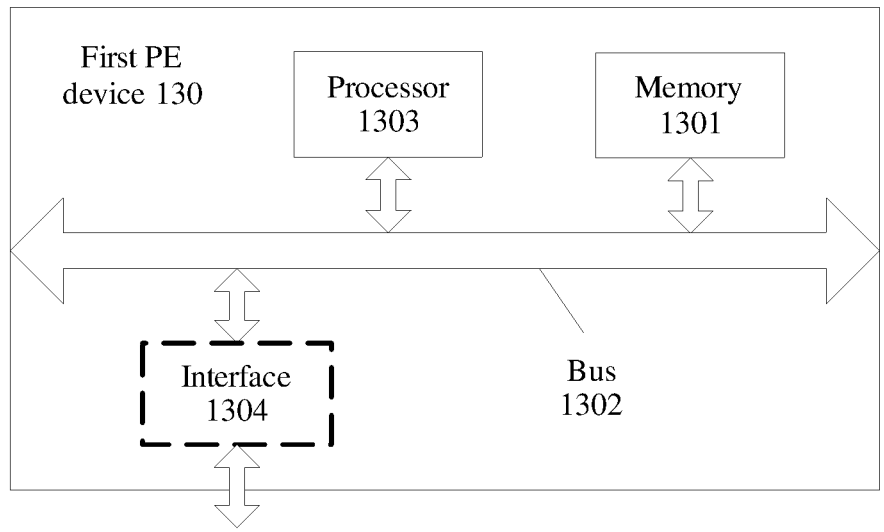
FIG. 13 is a schematic hardware structural diagram of a first PE device according to an embodiment of this application.
Figure 14:
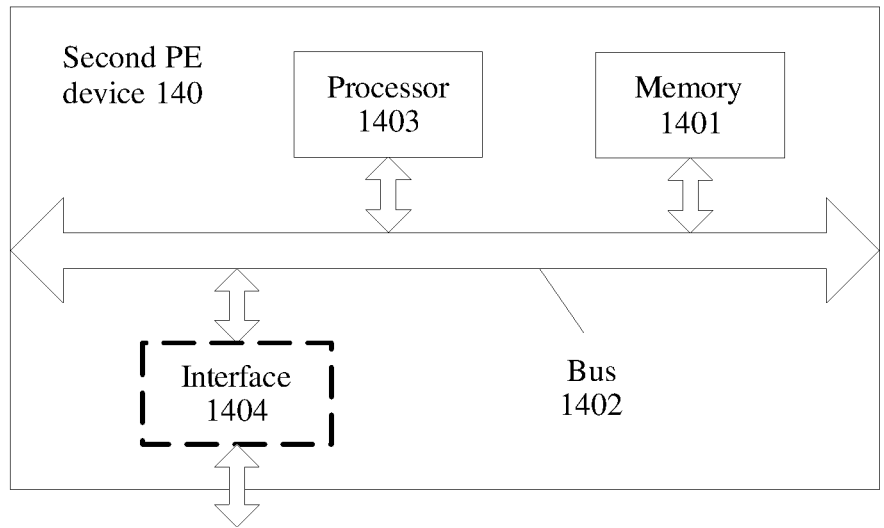
FIG. 14 is a schematic hardware structural diagram of a second PE device according to an embodiment of this application.
Figure 15:
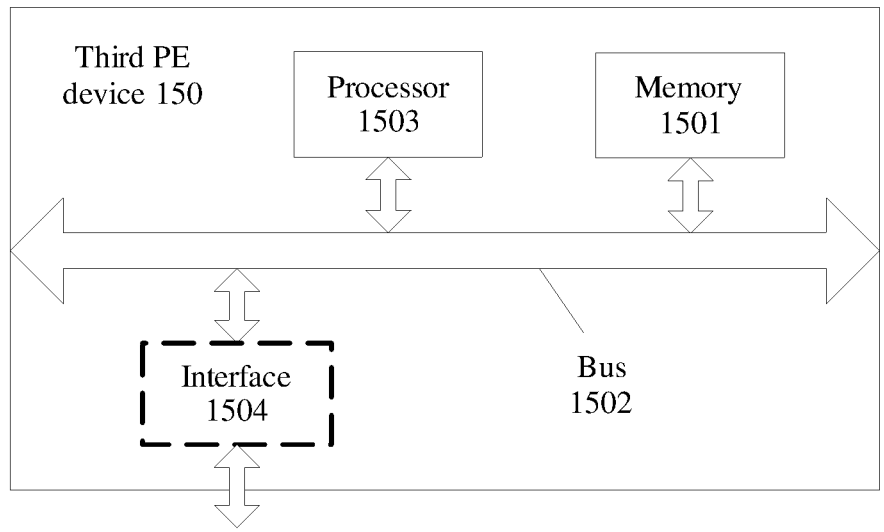
FIG. 15 is a schematic hardware structural diagram of a third PE device according to an embodiment of this application.
Figure 16:
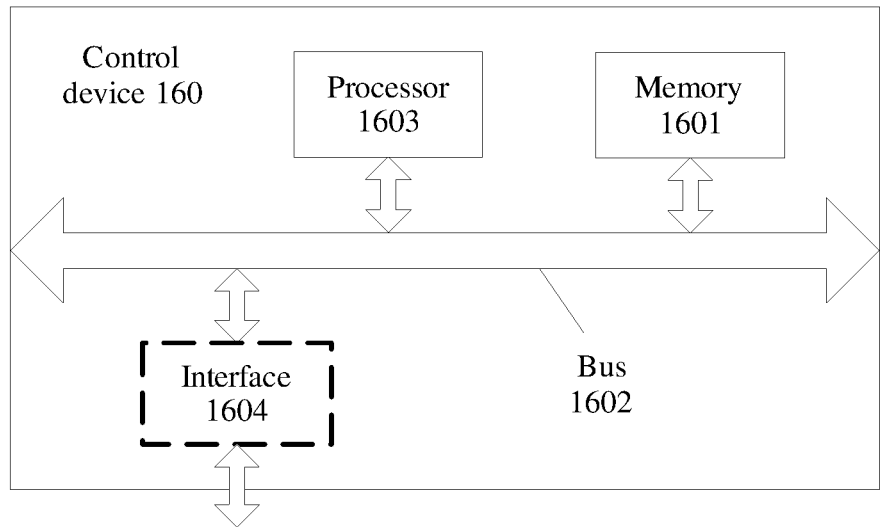
FIG. 16 is a schematic hardware structural diagram of a control device according to an embodiment of this application.

Therefore, based on the packet processing method disclosed in FIG. 3 to FIG. 8, the embodiments of this application further correspondingly disclose a first PE device 130 in FIG. 13, a second PE device 140 in FIG. 14, a third PE device 150 in FIG. 15, and a control device 160 in FIG. 16. The first PE device 130 in FIG. 13 may be the first PE device in the embodiments corresponding to FIG. 3 to FIG. 8, and may perform the packet processing method of the first PE device disclosed in the foregoing embodiments. The second PE device 140 in FIG. 14 may be the second PE device in the embodiments corresponding to FIG. 3 to FIG. 8, and may perform the packet processing method of the second PE device disclosed in the foregoing embodiments. The third PE device 150 in FIG. 15 may be the third PE device in the embodiments corresponding to FIG. 3 to FIG. 8, and may perform the packet processing method of the third PE device disclosed in the foregoing embodiments. The control device 160 in FIG. 16 may be the control device in the embodiment corresponding to FIG. 7A and FIG. 7B, and may perform the packet processing method of the control device disclosed in the foregoing embodiment.

As shown in FIG. 13, the first PE device 130 includes a memory 1301, a bus 1302, a processor 1303, and an interface 1304. The interface 1304 may be implemented in a wireless or wired manner, and may be specifically an element such as a network adapter. The memory 1301, the processor 1303, and the interface 1304 are connected by using the bus 1302.

The interface 1304 may specifically include a transmitter and a receiver used by the first PE device to receive packets from and transmit packets to a second PE device, a third PE device, and a control device in the embodiments of this application. For a specific process, refer to a corresponding part of receiving and transmitting packets by the first PE device in the embodiments of this application, and details are not described herein again.

The processor 1303 is configured to perform a part, related to the first PE device, of the packet processing method in the embodiments of this application. For a specific process, refer to the foregoing embodiments, and details are not described herein again.

The memory 1301 includes an operating system and an application, and is configured to store an operation program, code, or an instruction for packet processing. When the processor 1303 or a hardware device performs packet processing, the processor 1303 or the hardware device invokes and executes the program, the code, or the instruction, to complete a packet processing process related to the first PE device in FIG. 4 to FIG. 8. For a specific process, refer to the corresponding part in the embodiments of this application, and details are not described herein again.

It may be understood that FIG. 13 shows only a simplified design of the first PE device. In actual application, the first PE device may include any quantities of interfaces, processors, memories, and the like.

In addition, an embodiment of this application provides a computer storage medium, configured to store a computer software instruction used by the first PE device. The computer software instruction includes a program related to the first PE device in the foregoing embodiment.

As shown in FIG. 14, the second PE device 140 includes a memory 1401, a bus 1402, a processor 1403, and an interface 1404. The interface 1404 may be implemented in a wireless or wired manner, and may be specifically an element such as a network adapter. The memory 1401, the processor 1403, and the interface 1404 are connected by using the bus 1402.

The interface 1404 may specifically include a transmitter and a receiver used by the second PE device to receive packets from and transmit packets to a first PE device and a third PE device in the embodiments of this application. For a specific process, refer to a corresponding part of receiving and transmitting packets by the second PE device in the embodiments of this application, and details are not described herein again.

The processor 1403 is configured to perform a part, related to the second PE device, of the packet processing method in the embodiments of this application. For a specific process, refer to the foregoing embodiments, and details are not described herein again.

The memory 1401 includes an operating system and an application, and is configured to store an operation program, code, or an instruction for packet processing. When the processor 1403 or a hardware device performs packet processing, the processor 1403 or the hardware device invokes and executes the program, the code, or the instruction, to complete a packet processing process related to the second PE device in FIG. 4 to FIG. 8. For a specific process, refer to the corresponding part in the embodiments of this application, and details are not described herein again.

It may be understood that FIG. 14 shows only a simplified design of the second PE device. In actual application, the second PE device may include any quantities of interfaces, processors, memories, and the like.

In addition, an embodiment of this application provides a computer storage medium, configured to store a computer software instruction used by the second PE device. The computer software instruction includes a program related to the second PE device in the foregoing embodiment.

FIG. 15 is a schematic hardware structural diagram of a third PE device 150 according to an embodiment of this application. The third PE device 150 in FIG. 15 may perform corresponding steps performed by the third PE device in the embodiments of this application.

As shown in FIG. 15, the third PE device 150 includes a memory 1501, a bus 1502, a processor 1503, and an interface 1504. The interface 1504 may be implemented in a wireless or wired manner, and may be specifically an element such as a network adapter. The memory 1501, the processor 1503, and the interface 1504 are connected by using the bus 1502.

The interface 1504 may specifically include a transmitter and a receiver used by the third PE device to receive packets from and transmit packets to a first PE device, a second PE device, and a CE device in the embodiments of this application. For example, for a specific process of the interface 1504, refer to a corresponding part of receiving packets from and transmitting packets to the first PE device and the second PE device by the third PE device in the embodiments of this application, and details are not described herein again.

The processor 1503 is configured to perform a packet processing part performed by the third PE device in the embodiments of this application. For example, the processor 1503 is configured to perform a corresponding operation based on a received MAC-withdraw packet, or a received BFD down packet. For a specific process, refer to the corresponding part in the embodiments of this application, and details are not described herein again.

The memory 1501 includes an operating system and an application, and is configured to store a program, code, or an instruction for packet updating. When the processor 1503 or a hardware device performs packet updating, the processor 1303 or the hardware device invokes and executes the program, the code, or the instruction, to complete a processing process related to the third PE device in the foregoing embodiments. For a specific process, refer to the corresponding part in the embodiments of this application, and details are not described herein again.

It may be understood that FIG. 15 shows only a simplified design of the third PE device. In actual application, the third PE device may include any quantities of interfaces, processors, memories, and the like.

In addition, an embodiment of this application provides a non-volatile computer readable storage medium, configured to store a computer software instruction used by the third PE device. The computer software instruction includes a program related to the third PE device in the foregoing embodiment.

As shown in FIG. 16, the control device 160 includes a memory 1601, a bus 1602, a processor 1603, and an interface 1604. The interface 1604 may be implemented in a wireless or wired manner, and may be specifically an element such as a network adapter. The memory 1601, the processor 1603, and the interface 1604 are connected by using the bus 1602.

The interface 1604 may specifically include a transmitter and a receiver used by the control device to receive packets from and transmit packets to a first PE device and a third PE device in the embodiments of this application. For a specific process, refer to a corresponding part of receiving and transmitting packets by the control device in the embodiments of this application, and details are not described herein again.

The processor 1603 is configured to perform a part, related to the control device, of the packet processing method in the embodiments of this application. For a specific process, refer to the foregoing embodiments, and details are not described herein again.

The memory 1601 includes an operating system and an application, and is configured to store an operation program, code, or an instruction for packet processing. When the processor 1603 or a hardware device performs packet processing, the processor 1603 or the hardware device invokes and executes the program, the code, or the instruction, to complete a packet processing process related to the control device in FIG. 7A and FIG. 7B. For a specific process, refer to the corresponding part in the embodiments of this application, and details are not described herein again.

It may be understood that FIG. 16 shows only a simplified design of the control device. In actual application, the control device may include any quantities of interfaces, processors, memories, and the like.

In addition, an embodiment of this application provides a computer storage medium, configured to store a computer software instruction used by the control device. The computer software instruction includes a program related to the control device in the foregoing embodiment.

Figure 17:
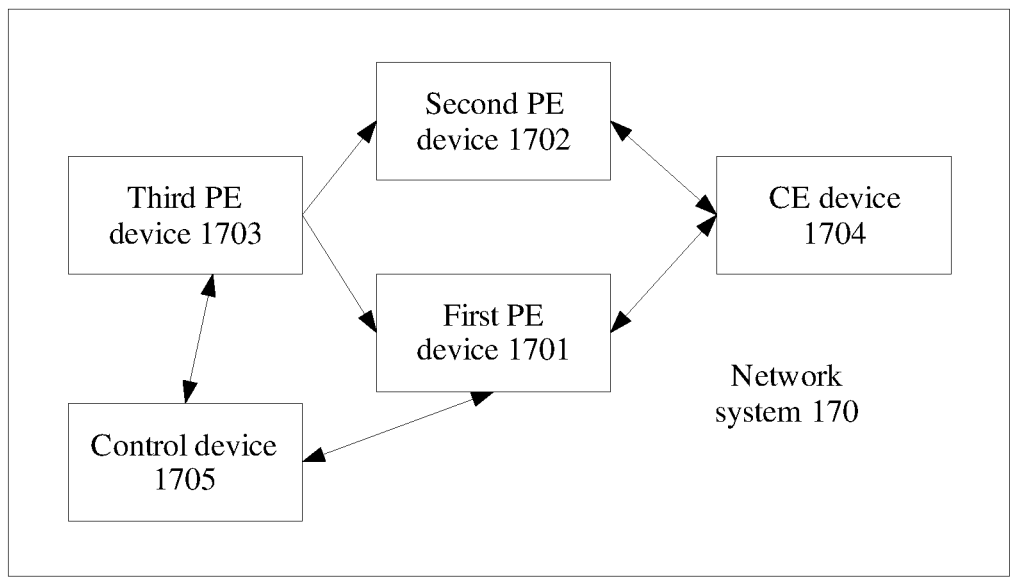
FIG. 17 is a schematic structural diagram of a network system according to an embodiment of this application.

FIG. 17 shows a network system 90 used to implement a packet processing method according to an embodiment of this application. The network system 90 mainly includes a first PE device 1701, a second PE device 1702, a third PE device 1703, and a CE device 1704.

In the network system disclosed in this embodiment of this application, the first PE device 1701 may be specifically the first PE device disclosed in FIG. 9 and FIG. 13. For a specific process and an execution principle, refer to the foregoing descriptions, and details are not described herein again.

The second PE device 1702 may be specifically the second PE device disclosed in FIG. 10 and FIG. 14. For a specific process and an execution principle, refer to the foregoing descriptions, and details are not described herein again.

The third PE device 1703 may be specifically the third PE device disclosed in FIG. 11 and FIG. 15. For a specific process and an execution principle, refer to the foregoing descriptions, and details are not described herein again.

Optionally, a control device 1705 may be further included. The control device 1705 may be specifically the control device disclosed in FIG. 12 and FIG. 16. For a specific process and an execution principle, refer to the foregoing descriptions, and details are not described herein again.

In conclusion, when the port that is of the first PE device and that is connected to the CE device is switched from the activated state to the deactivated state, the second PE device switches the port that is of the second PE device and that is connected to the CE device from the deactivated state to the activated state. The first PE device sends the MAC entry update packet to the third PE device, to trigger the third PE device to delete the first MAC entry whose packet forwarding destination address is the first PE device, generate, through learning, the second MAC entry whose packet forwarding destination address is the second PE device, and forward a packet based on the second MAC entry. Therefore, after a fault occurs on a PE device, where a port that is of the PE device and that is connected to the CE device is in the activated state, a route is rapidly switched to a standby PE device to restore a link to forward a packet, so that reliability of the VXLAN network is ensured. Further, a new packet forwarding destination address is designated, so that consistency between a transmission direction of an uplink packet and a transmission direction of a downlink packet is ensured, helping a firewall to detect a packet.

Furthermore, when a fault occurs on the first PE device, a WAN-side BFD session between the first PE device and the third PE device is interrupted. The third PE device receives the BFD down packet that is reported through the port connected to the first PE device. The third PE device performs, based on the BFD down packet, an operation of deleting the first MAC entry whose packet forwarding destination address is the first PE device, and then enables a sent packet to pass through the second PE device to arrive at the first PE device, to rapidly restore link transmission and improve security of the VXLAN network.

The parts in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to the descriptions in the method embodiment.

The foregoing specific implementations further describe in detail the objective, the technical solutions, and the beneficial effects of this application. It should be further understood that the foregoing descriptions are merely specific implementations of this application.

What is claimed is:

1. A packet processing method comprising:
determining, by a first provider edge (PE) device, a fault occurrence on a link between the first PE device and a customer edge (CE) device when a first fault detection packet from the CE device is not received within a preset period, wherein the CE device is dual-homed to the first PE device and a second PE device through multi chassis trunk (MC-trunk) links including the link between the first PE device and the CE device;
switching, by the first PE, a first PE port coupled to the link between the first PE device and the CE device from an activated state to a deactivated state based on the determination of the fault occurrence on the link; and
discontinuing transmission of a port status packet to a second PE device based on the determination of the fault occurrence on the link, wherein the port status packet indicates the first PE port is in a normal state; and
sending, by the first PE device, a Media Access Control (MAC) entry update packet to a third PE device, wherein the MAC entry update packet instructs the third PE device to delete a first MAC entry with a packet forwarding destination address set as the first PE device.

2. The method according to claim 1, wherein sending the MAC entry update packet to the third PE device comprises:
sending, by the first PE device, the MAC entry update packet to a control device, wherein the MAC entry update packet is a notification message, wherein the notification message instructs the control device to generate a Media Access Control-withdraw (MAC-withdraw) packet and send the MAC-withdraw packet to the third PE device, and wherein the MAC-withdraw packet instructs the third PE device to delete the first MAC entry with the packet forwarding destination address set as the first PE device.

3. The method according to claim 1, wherein sending the MAC entry update packet to the third PE device comprises:
sending, by the first PE device, the MAC entry update packet to the second PE device, wherein the MAC entry update packet is a notification message, wherein the notification message instructs the second PE device to send a first MAC-withdraw packet to the third PE device via an Ethernet virtual private network (EVPN) protocol, wherein the notification message further instructs the second PE device to generate the first MAC-withdraw packet by extending an Ethernet autodiscovery per Ethernet segment (Ethernet A-D per ES) route in the EVPN protocol, wherein the first MAC-withdraw packet instructs the third PE device to delete the first MAC entry with the packet forwarding destination address set as the first PE device, and wherein the first PE device establishes an EVPN peer relationship with the second PE device and with the third PE device.

4. The method according to claim 1, wherein sending the MAC entry update packet to the third PE device comprises:
sending, by the first PE device, the MAC entry update packet to the second PE device, wherein the MAC entry update packet is a notification message, wherein the notification message instructs the second PE device to send a second MAC-withdraw packet to the third PE device via an Ethernet virtual private network (EVPN) protocol, wherein the notification message further instructs the second PE device to generate the first MAC-withdraw packet by extending an advertisement message in the EVPN protocol, wherein the second MAC-withdraw packet instructs the third PE device to delete the first MAC entry with the packet forwarding destination address set as the first PE device, and wherein the first PE device establishes an EVPN peer relationship with the second PE device and the third PE device.

5. The method according to claim 1, wherein sending the MAC entry update packet to the third PE device comprises:
extending, by the first PE device, an Ethernet auto-discovery per Ethernet segment (Ethernet A-D per ES) route in an Ethernet virtual private network (EVPN) protocol to generate a first MAC-withdraw packet, wherein the first MAC-withdraw packet instructs the third PE device to delete the first MAC entry with the packet forwarding destination address set as the first PE device, and wherein the first MAC-withdraw packet instructs the third PE device to use the first MAC-withdraw packet as the MAC entry update packet; and
sending, by the first PE device, the MAC entry update packet to the third PE device via the EVPN protocol, wherein the first PE device establishes an EVPN peer relationship with the second PE device and the third PE device.

6. The method according to claim 1, wherein sending, the MAC entry update packet to the third PE device comprises:
extending, by the first PE device, an advertisement message in an Ethernet virtual private network (EVPN) protocol to generate a second MAC-withdraw packet, wherein the second MAC-withdraw packet instructs the third PE device to delete the first MAC entry with the packet forwarding destination address set as the first PE device, wherein the second MAC-withdraw packet instructs the third PE device to use the second MAC-withdraw packet as the MAC entry update packet; and
sending, by the first PE device, the MAC entry update packet to the third PE device via the EVPN protocol, wherein the first PE device establishes an EVPN peer relationship with the second PE device and the third PE device.

7. A first provider edge (PE) device comprising:
a first PE device port configured to couple to a link between the first PE device and the CE device, wherein the first PE device port is initially set in an active state;
a non-transitory memory storing instructions; and
a processor coupled to the non-transitory memory, wherein the instructions, when executed by the processor, cause the first PE device to:
determine a fault occurrence on the link between the first PE device and a customer edge (CE) device when a first fault detection packet from the CE device is not received within a preset period, wherein the CE device is dual-homed to the first PE device and a second PE device through multi chassis trunk (MC-trunk) links including the link between the first PE device and the CE device;
switch the first PE device port from the activated state to a deactivated state based on the determination of the fault occurrence on the link;
discontinue transmission of a port status packet to the second PE device based on the determination of the fault occurrence on the link, wherein the port status packet is indicates the first PE device port is in a normal state; and
send a Media Access Control (MAC) entry update packet to a third PE device, wherein the MAC entry update packet instructs the third PE device to delete a first MAC entry with a packet forwarding destination address set as the first PE device.

8. The first PE device according to claim 7, wherein, when executed by the processor, the instructions further cause the first PE device to:
send the MAC entry update packet to a control device, wherein the MAC entry update packet is a notification message, wherein the notification message instructs the control device to generate a Media Access Control-withdraw (MAC-withdraw) packet and instructs the control device to send the MAC-withdraw packet to the third PE device, wherein the MAC-withdraw packet instructs the third PE device to delete the first MAC entry with the packet forwarding destination address set as the first PE device.

9. The first PE device according to claim 7, wherein the instructions, when executed by the processor, further cause the first PE device to:
send the MAC entry update packet to the second PE device, wherein the MAC entry update packet is a notification message, wherein the notification message instructs the second PE device to send a first MAC-withdraw packet to the third PE device via an Ethernet virtual private network (EVPN) protocol, wherein the notification message further instructs the second PE device to generate the first MAC-withdraw packet by extending an Ethernet auto-discovery per Ethernet segment (Ethernet A-D per ES) route in the EVPN protocol, wherein the first MAC-withdraw packet instructs the third PE device to delete the first MAC entry with the packet forwarding destination address set as the first PE device, and wherein the first PE device establishes an EVPN peer relationship with the second PE device and the third PE device.

10. The first PE device according to claim 7, wherein the instructions, when executed by the processor, further cause the first PE device to:
send the MAC entry update packet to the second PE device, wherein the MAC entry update packet is a notification message, wherein the notification message instructs the second PE device to send a second MAC-withdraw packet to the third PE device via an Ethernet virtual private network (EVPN) protocol, wherein the notification message further instructs the second PE device to generate the second MAC-withdraw packet by extending an advertisement message in the EVPN protocol, wherein the second MAC-withdraw packet instructs the third PE device to delete the first MAC entry with the packet forwarding destination address set as the first PE device, and wherein the first PE device establishes an EVPN peer relationship with the second PE device and the third PE device.

11. The first PE device according to claim 7, wherein the instructions, when executed by the processor, further cause the first PE device to:

extend an Ethernet auto-discovery per Ethernet segment (Ethernet A-D per ES) route in an Ethernet virtual private network (EVPN) protocol to generate a first MAC-withdraw packet, wherein the first MAC-withdraw packet instructs the third PE device to delete the first MAC entry with the packet forwarding destination address set as the first PE device, wherein the first MAC-withdraw packet instructs the third PE device to use the first MAC-withdraw packet as the MAC entry update packet; and send the MAC entry update packet to the third PE device via the EVPN protocol, wherein the first PE device establishes an EVPN peer relationship with the second PE device and the third PE device.

12. The first PE device according to claim 7, wherein the instructions, when executed by the processor, further cause the first PE device to:

extend an advertisement message in an Ethernet virtual private network (EVPN) protocol to generate a second MAC-withdraw packet, wherein the second MAC-withdraw packet instructs the third PE device to delete the first MAC entry with the packet forwarding destination address as the first PE device, wherein the second MAC-withdraw packet instructs the third PE device to use the second MAC-withdraw packet as the MAC entry update packet; and send the MAC entry update packet to the third PE device via the EVPN protocol, wherein the first PE device establishes an EVPN peer relationship with the second PE device and the third PE device.

13. A second provider edge (PE) device comprising:

a second PE port configured to couple to a customer edge (CE) device, wherein the second PE port is initially set in a deactivated state;

a non-transitory memory storing instructions; and a processor coupled to the non-transitory memory, wherein the instructions, when executed by the processor, cause the second PE device to:

determine a fault occurrence on a link between a first PE device and the CE device or a fault occurrence on the first PE device when a port status packet is not received from the first PE device within a preset period;

switch the second PE port from the deactivated state to an activated state based on the determination of the fault occurrence, wherein the port status packet indicates a first PE device port that is connected to the CE device is in a normal state; and extend an Ethernet virtual private network (EVPN) protocol packet to generate a MAC-withdraw packet based on the determination of the fault occurrence, wherein the MAC-withdraw packet instructs a third PE device to delete a first MAC entry with a packet forwarding destination address set as the first PE device;

receive a Media Access Control (MAC) entry update packet from the first PE device, wherein the MAC entry update packet is a notification message, and wherein the notification message instructs the second PE device to send the MAC-withdraw packet to the third PE device by using an EVPN protocol; and send the MAC-withdraw packet to the third PE device based on the notification message by using the EVPN protocol.

14. The second PE device according to claim 13, wherein the instructions, when executed by the processor, further cause the second PE device to:

extend an Ethernet auto-discovery per Ethernet segment (Ethernet A-D per ES) route in the EVPN protocol to generate a first MAC-withdraw packet; and use the first MAC-withdraw packet as the MAC-withdraw packet.

15. The second PE device according to claim 13, wherein the instructions, when executed by the processor, further cause the second PE device to:

extend an advertisement message in the EVPN protocol to generate a second MAC-withdraw packet; and use the second MAC-withdraw packet as the MAC-withdraw packet.

16. The second PE device according to claim 13, wherein the second PE device establishes EVPN peer relationship with the first PE device and the third PE device.

17. The second PE device according to claim 13, wherein the first PE device and the second PE device are connected to the CE device through multi chassis trunk (MC-trunk) links.

18. The second PE device according to claim 17, wherein the CE device is dual-homed to the first PE device and a second PE device through the MC-trunk links.

19. The second PE device according to claim 13, wherein the second PE device is configured to communicate with the third PE device through virtual extensible local area network (VXLAN) tunnels.

20. The second PE device according to claim 13, wherein the port status packet is part of a bidirectional forwarding detection (BFD) session.

* * * * *